(12) United States Patent
Hersam et al.

(10) Patent No.: US 10,703,637 B2
(45) Date of Patent: Jul. 7, 2020

(54) BOROPHENES, BORON LAYER ALLOTROPES AND METHODS OF PREPARATION

(71) Applicants: Northwestern University, Evanston, IL (US); UChicago Argonne, LLC, Chicago, IL (US)

(72) Inventors: Mark C. Hersam, Wilmette, IL (US); Joshua D. Wood, Chicago, IL (US); Andrew J. Mannix, Chicago, IL (US); Brian T. Kiraly, Hillsboro Beach, FL (US); Brandon L. Fisher, Plainfield, IL (US); Nathan P. Guisinger, Darien, IL (US)

(73) Assignees: NORTHWESTERN UNIVERSITY, Evanston, IL (US); UCHICAGO ARGONNE, LLC, Chicago, IL (US)

( * ) Notice: Subject to any disclaimer, the term of this patent is extended or adjusted under 35 U.S.C. 154(b) by 451 days.

(21) Appl. No.: 15/430,885

(22) Filed: Feb. 13, 2017

(65) Prior Publication Data

US 2019/0002298 A1 Jan. 3, 2019

Related U.S. Application Data

(60) Provisional application No. 62/388,970, filed on Feb. 12, 2016.

(51) Int. Cl.
*C01B 35/02* (2006.01)

(52) U.S. Cl.
CPC .......... *C01B 35/02* (2013.01); *C01P 2002/85* (2013.01); *C01P 2004/03* (2013.01); *C01P 2004/04* (2013.01)

(58) Field of Classification Search
None
See application file for complete search history.

(56) References Cited

FOREIGN PATENT DOCUMENTS

WO 2015132764 A1 11/2015

OTHER PUBLICATIONS

Mannix, Andrew J., et al, "Synthesis of borophenes: Anisotropic, two-dimensional boron polymorphs," Science, Dec. 18, 2015, 1513-1516 (Year: 2015).*
Zhai, Hua-Jin, et al, "Observation of an all-boron fullerene" Nature Magazine, vol. 6, Aug. 2004, pp. 727-731 (Year: 2004).*
Mannix, Andrew, et al, "Sythesis of Borophenes: Anisotropic Two-Dimensional Boron Polymorphs," Science 350 (6267), 1513-1516, Dec. 15, 2015 (Year: 2015).*
Tai, G. et al., "Synthesis of Atomically Thin Boron Films on Copper Foils", Angewandte Chemie, 127, 15693-15697 (2015).
Zhang, Z. et al., "Two-Dimensional Boron Monolayers Mediated by Metal Substrates", Angewandte Chemie, 127, 13214-13218 (2015).
Liu, Y. et al., "Probing the Synthesis of Two-Dimensional Boron by First-Principles Computations", Angewandte Chemie 52, 3156 (2013).

(Continued)

*Primary Examiner* — Daniel J. Schleis
(74) *Attorney, Agent, or Firm* — Locke Lord LLP; Tim Tingkang Xia, Esq.

(57) ABSTRACT

A boron allotrope comprising an elemental boron layer comprising a boron atomic thickness dimension and a method for preparation thereof.

18 Claims, 38 Drawing Sheets
(37 of 38 Drawing Sheet(s) Filed in Color)

(56) References Cited

OTHER PUBLICATIONS

Li, W.L. et al., "The B35 Cluster with a Double-Hexagonal Vacancy: A New and More Flexible Structural Motif for Borophene" J. Am. Chem. Soc. 136, 12257-12260 (2014).

Amsler, M. et al., "Conducting Boron Sheets Formed by the Reconstruction of the alpha-Boron (111) Surface", Phys. Rev. Lett. 111, 136101 (2013).

* cited by examiner

BOROPHENES, BORON LAYER ALLOTROPES AND METHODS OF PREPARATION

This application claims priority to and the benefit of application Ser. No. 62/388,970, filed Feb. 12, 2016, the entirety of which is incorporated herein by reference.

This invention was made with government support under DE-AC02-06CH11357 and DE-FG02-09ER16109 awarded by the Department of Energy; DMR-1121262 and DGE-0824162 awarded by the National Science Foundation; and N00014-14-10669 awarded by the Office of Naval Research. The government has certain rights in the invention.

BACKGROUND OF THE INVENTION

Bonding between boron atoms is more complex than in carbon; for example, both two- and three-center B—B bonds can form. The interaction between these bonding configurations results in as many as 16 bulk allotropes of boron, composed of icosahedral $B_{12}$ units, small interstitial clusters, and fused supericosahedra. In contrast, small (n<15) boron clusters form simple covalent, quasi-planar molecules with carbon-like aromatic or anti-aromatic electronic structure. Recently, it was shown that $B_{40}$ clusters form a cage-like fullerene, further extending the parallels between boron and carbon cluster chemistry.

To date, experimental investigations of nanostructured boron allotropes are notably sparse, partly due to the costly and toxic precursors (e.g., diborane) typically used. However, numerous theoretical studies have examined 2D boron sheets (i.e., borophene). Although these studies propose various structures, the general class of 2D boron sheets is referred to as borophene. Based upon a quasi-planar $B_7$ cluster (FIG. 1A), an Aufbau principle has been proposed to construct nanostructures including puckered monolayer sheets (analogous to the relation between graphene and the aromatic ring). The stability of these sheets is enhanced by vacancy superstructures or out-of-plane distortions. Early reports of multiwall boron nanotubes suggested a layered structure, but their atomic-scale structure remains unresolved. It is therefore unknown whether borophene is experimentally stable and whether the borophene structure would reflect the simplicity of planar boron clusters or the complexity of bulk boron phases.

SUMMARY OF THE INVENTION

In light of the foregoing, it can be an object of the present invention to provide borophene, related boron allotropes and/or method(s) for preparation thereof, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can be an object of the present invention to provide a method for preparation of borophene and/or a boron allotrope without resort to use of toxic precursors of the prior art.

It can also be an object of the present invention to provide a method of using synthetic conditions to vary and/or control a morphological phase of such a boron allotrope.

It can also be an object of the present invention, alone or in conjunction with one or more of the preceding objectives, to provide a stable, atomically-thin boron allotrope.

Other objects, features, benefits and advantages of the present invention will be apparent from this summary and the following descriptions of various preferred embodiments, and will be readily apparent to those skilled in the art having knowledge of elemental boron, nano-dimensioned allotropes thereof and methods for preparation. Such objects, features, benefits and advantages will be apparent from the above as taken into conjunction with the accompanying examples, data, figures and all reasonable inferences to be drawn therefrom, alone or with consideration of the references incorporated herein.

In part, the present invention can be directed to a boron allotrope comprising an elemental boron layer comprising a boron atomic thickness dimension. In certain non-limiting embodiments, such an allotrope can comprise a rectangular boron lattice. Alternatively, the present invention can be directed to a boron allotrope comprising an elemental boron monolayer comprising a boron atomic thickness dimension, such an allotrope as can be absent a boron compound, a boron alloy or both. In certain non-limiting embodiments, such an allotrope can comprise a rectangular boron lattice. Alternatively, the present invention can be directed to a metallic boron allotrope comprising an elemental boron layer comprising a rectangular boron lattice and boron atomic thickness dimension.

In part, the present invention can also be directed a borophene which can comprise an elemental boron layer comprising a boron atomic thickness dimension. In certain non-limiting embodiments, such a borophene can comprise a rectangular boron lattice. In certain such embodiments, such a borophene can be absent a boron compound, a boron alloy or both. Regardless, such a borophene can be metallic.

In part, the present invention can be directed to an article of manufacture comprising a substrate; and a boron allotrope coupled or connected to, thereon or otherwise contacting such a substrate. Such an allotrope can comprise an elemental boron layer of boron atoms comprising a boron atomic thickness dimension. In certain non-limiting embodiments, such an allotrope can comprise a rectangular boron lattice. As a separate consideration, such a substrate can comprise silver. In certain such embodiments, such a substrate can comprise single crystal Ag(111). As can relate thereto, such a boron allotrope thereon can comprise at least one of a homogenous boron phase and a striped boron phase. Regardless, such an allotrope can be metallic.

In part, the present invention can also be directed to an article comprising a silver substrate; and a metallic boron allotrope thereon. Such an allotrope can comprise an elemental boron monolayer of boron atoms comprising a boron atomic thickness dimension, such an allotrope as can be absent a boron compound, a boron alloy or both. In certain non-limiting embodiments, such a substrate can comprise single crystal Ag(111). In certain such embodiments, such a boron allotrope thereon can comprise at least one of a homogenous boron phase and a striped boron phase. Regardless, such a substrate and allotrope thereon can be absent oxygen and/or carbon contamination.

In part, the present invention can also be directed to a method of preparing an atomically-dimensioned elemental boron allotrope. Such a method can comprise providing a substrate at a temperature greater than about 200° C.; generating elemental boron vapor from a solid elemental boron source; and contacting such a substrate with such boron vapor for at least one of a rate and at a pressure sufficient to deposit, on such a substrate, a boron allotrope which can comprise an elemental boron layer comprising a boron atomic thickness dimension. As described below and illustrated elsewhere herein, such a method can be employed under negative pressure.

In certain non-limiting embodiments, such a substrate can comprise silver. In certain such embodiments, such a substrate can comprise single crystal Ag(111). As can relate thereto, such a boron allotrope thereon can comprise at least one of a homogenous boron phase and a striped boron phase. In certain other non-limiting embodiments, such a substrate can be at a temperature of about 400° C. to about 750° C. In certain such embodiments, a higher substrate temperature within such a range can promote such a striped boron phase. In certain other non-limiting embodiments, as a separate consideration, the rate of boron allotrope deposition can be about 0.01 to about 0.1 layer of elemental boron per minute. In certain such embodiments, a greater deposition rate within such a range can promote such a homogenous boron phase. Regardless, such a solid boron source can be about 99.9999% pure. As can relate thereto, such a method can be employed at a pressure to provide desired boron source purity and/or the absence of carbon and/or oxygen in such a deposited boron allotrope. In certain such embodiments, such a method can be employed at a pressure less than about $10^{-8}$ mBar. In certain non-limiting embodiments, such a method can be employed at a pressure of about $10^{-9}$ to about $10^{-11}$ mBar.

In part, the present invention can also be directed to a method of preparing an atomically-dimensioned elemental boron allotrope monolayer. Such a method can comprise providing a silver substrate at a temperature of about 400° C. to about 750° C.; generating elemental boron vapor from a solid elemental boron source; and contacting such a substrate with such boron vapor under a pressure at least as low as about $10^{-9}$ mBar, such contact as can be at a rate sufficient to deposit, on such a substrate, a boron allotrope comprising an elemental boron monolayer comprising a boron atomic thickness dimension, whereby such a method does not provide a boron compound and/or a boron alloy.

In certain non-limiting embodiments, such a substrate can comprise single crystal Ag(111). As can relate thereto, such a boron allotrope deposited thereon can comprise at least one of a homogenous boron phase and a striped boron phase. In certain other non-limiting embodiments, such a substrate temperature can be about 450° C. to about 700° C.; and such a rate of deposition can be about 0.01 to about 0.1 layer of elemental boron per minute. In certain such embodiments, a higher substrate temperature within such a range can promote such a striped boron phase. In certain other such embodiments, a greater deposition rate within such a range can promote such a homogenous boron phase. Regardless, such a solid boron source can be about 99.9999% pure; and such a deposited boron allotrope can be absent carbon and/or oxygen.

BRIEF DESCRIPTION OF THE DRAWINGS

The patent or application filed contains at least one drawing executed in color. Copies of this patent or patent application publication with color drawing(s) will be provided by the office upon request and payment of the necessary fee.

DETAILED DESCRIPTION OF CERTAIN EMBODIMENTS

Figures 1A, 1B:
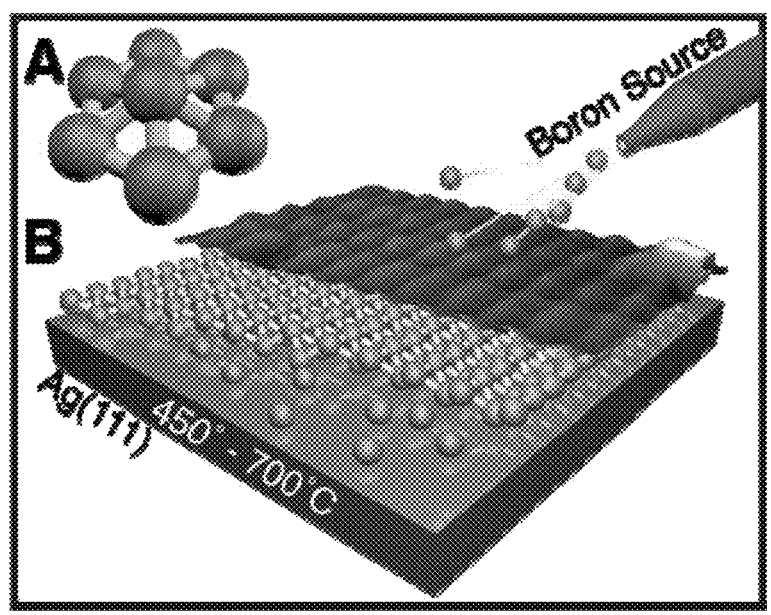
FIGS. 1A-L. Growth and atomic scale characterization of borophene sheets. Schematics of (A) distorted $B_7$ cluster (prior art) and (B) growth setup with atomic structure model and STM topography rendering. (C) AES spectra of clean Ag(111) before and after boron deposition. (D-I) Series of large-scale STM topography (left) and closed-loop dI/dV (right) images of borophene sheets, showing (D, E) low coverage ($V_{sample}$=2.0 V, $I_t$=100 pA), (F, G) medium coverage ($V_{sample}$=3.5 V, $I_t$=100 pA), and (H, I) high coverage ($V_{sample}$=3.5 V, $I_t$=100 pA). Regions of homogeneous phase, striped phase island, and striped phase nanoribbon are indicated with red, white, and blue arrows, respectively. (J-L) STM topography images showing: (J) Striped phase atomic-scale structure ($V_{sample}$=0.1 V, $I_t$=1.0 nA). Inset shows rectangular lattice with overlaid lattice vectors. (K) Striped phase with rhombohedral (indicated by white rhombus) and honeycomb (indicated by purple arrow) Moiré patterns ($V_{sample}$=3.5 V, $I_t$=100 pA). (L) Striped phase island demonstrating carpet-mode growth ($V_{sample}$=3.5 V, $I_t$=100 pA). Inset shows atomic continuity across the Ag(111) step ($V_{sample}$=−0.5 V, $I_t$=700 pA).

As can relate to certain non-limiting embodiments of this invention, atomically thin, borophene sheets can be grown under ultrahigh vacuum (UHV) conditions (FIG. 1B) using a solid boron atomic source (e.g., without limitation, 99.9999% purity) to avoid the difficulties posed by toxic precursors. An atomically clean Ag(111) substrate can provide a well-defined and inert surface for borophene growth. In situ scanning tunneling microscopy (STM) images show the emergence of planar structures which can exhibit anisotropic corrugation, consistent with first-principles structure prediction. The planar, chemically distinct, and atomically thin nature of such sheets are verified via a suite of characterization techniques. In situ electronic characterization supports theoretical predictions that borophene sheets are metallic with highly anisotropic electronic properties.

Figure 1C:
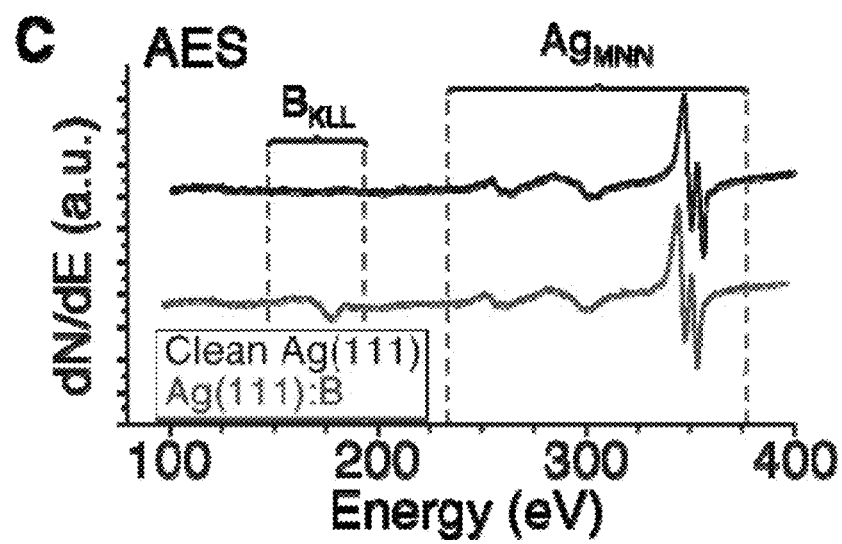

As can relate to certain such embodiments, during growth, the substrate was maintained between 450° and 700° C. under a boron flux between ~0.01 to ~0.1 monolayer (ML) per minute. After deposition, in situ Auger electron spectroscopy (AES; FIG. 1C) revealed a boron KLL peak at the standard position (180 eV) superimposed on the clean Ag(111) spectrum. No peaks due to contaminants were observed, and none of the distinctive peak shifts or satellite features characteristic of compound or alloy formation (FIG. 5).

After boron deposition at a substrate temperature of 550° C., STM topography images (FIG. 1D) revealed two distinct boron phases: a homogeneous phase and a more corrugated "striped" phase (highlighted with red and white arrows, respectively). Simultaneously acquired dI/dV maps (where I and V are the tunneling current and voltage, respectively) of the electronic density of states (DOS), given in FIG. 1E, showed strong electronic contrast between boron sheets and the Ag(111) substrate and increased differentiation between homogeneous and striped islands. The relative concentration of these phases depends upon the deposition rate. Low deposition rates favored the striped phase and resulted in the growth of striped phase nanoribbons (blue arrow, also FIG. 6). At higher deposition rates, more of the homogeneous islands were observed (FIG. 1F,G). Increasing growth temperatures favored the striped phase, suggesting that the homogeneous phase is metastable relative to the striped phase. Both phases exhibited threefold orientation degeneracy with respect to the substrate, as confirmed by low-energy electron diffraction (FIG. 7). The island size for both phases resembles graphene grown on Ag(111). At boron coverage approaching 1.0 ML, the substrate is completely covered by boron sheets and sparse clusters (FIGS. 1, H and I).

High-resolution STM images show anisotropic atomic-scale features for both phases. The homogeneous phase (FIG. 8) appears as atomic chains (0.30 nm periodicity) with periodic vertical buckling, a short-range rhombohedral Moiré pattern, and a longer range 1-D Moiré pattern (FIG. 8). The striped phase (FIG. 1J) consists of a rectangular lattice commensurate with regions of striped corrugation. The rectangular structure (inset) is defined by vectors a and b of lengths 0.51 nm (±0.02 nm) and 0.29 nm (±0.02 nm), respectively. Within the striped regions, the in-plane periodicity parallel to the a vector is reduced by the increased out-of-plane corrugation associated with the stripes. However, the periodicities along the stripes match the rectangular lattice in the b direction. Further analysis shows that the striped regions are simple distortions of the rectangular lattice that maximize the number of ideal boron adsorption sites (FIG. 9). The formation of these stripes was temperature-dependent, with fewer stripes observed at 450° C. and almost complete stripe coverage at 700° C. This is consistent with a progressive, thermally driven relaxation of the rectangular lattice into more favorable adsorption sites.

Rotationally misaligned striped phase islands coalesce via defects that accommodate the anisotropic corrugations to form a complete monolayer (FIG. 9). As shown in FIG. 1K, the striped regions exhibited Moiré patterns with rhombohedral (~8 nm period, marked by white rhombus) or, far less commonly, honeycomb (indicated by purple arrow) symmetry. These observations indicate the possibility of at least two well-defined long-range structural relationships between borophene and Ag(111). The borophene superstructure is evidently more complex than planar 2D materials such as BN, which forms a well-defined nanomesh on transition metals due to substrate interactions. The mildly attractive B—Ag interactions, result in enhanced corrugation and substrate-stabilized structural variation in borophene, providing additional degrees of freedom for functionality beyond conventional 2D materials.

Figure 1D:
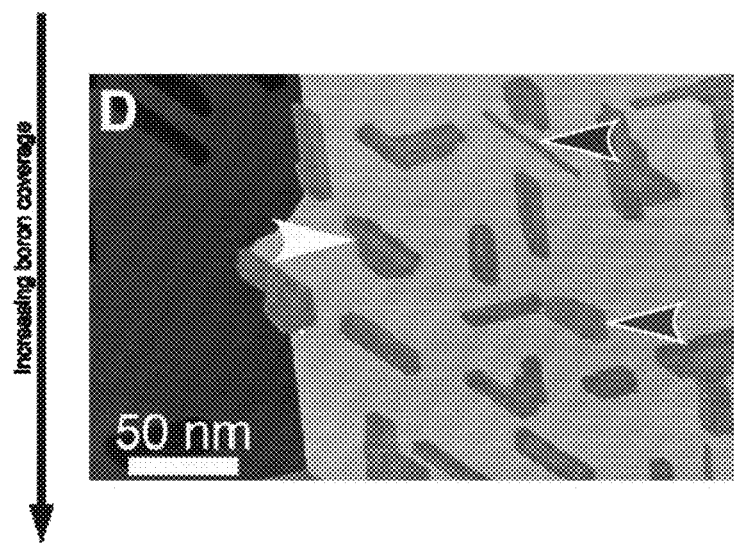
Figure 1E:
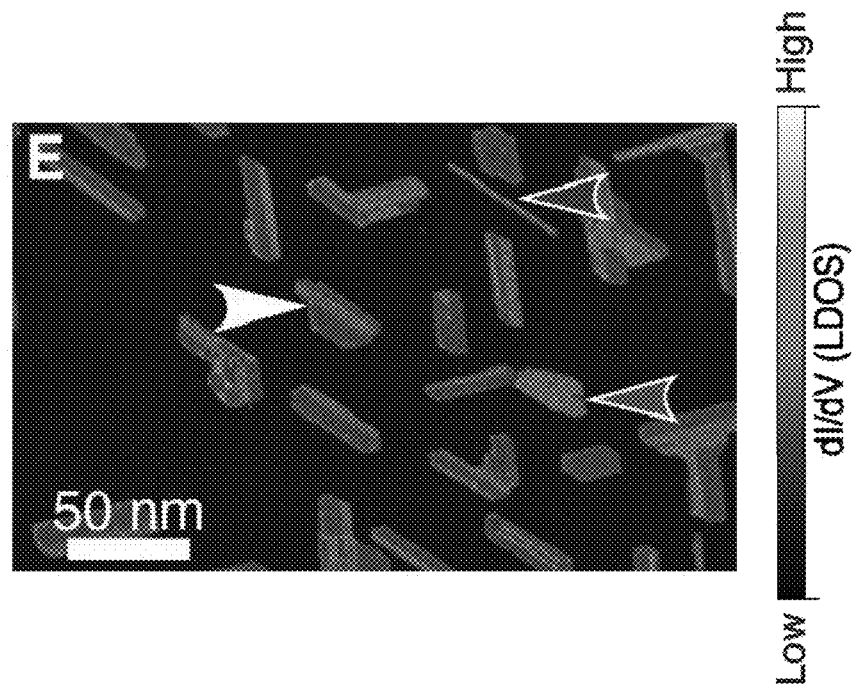
Figure 1F:
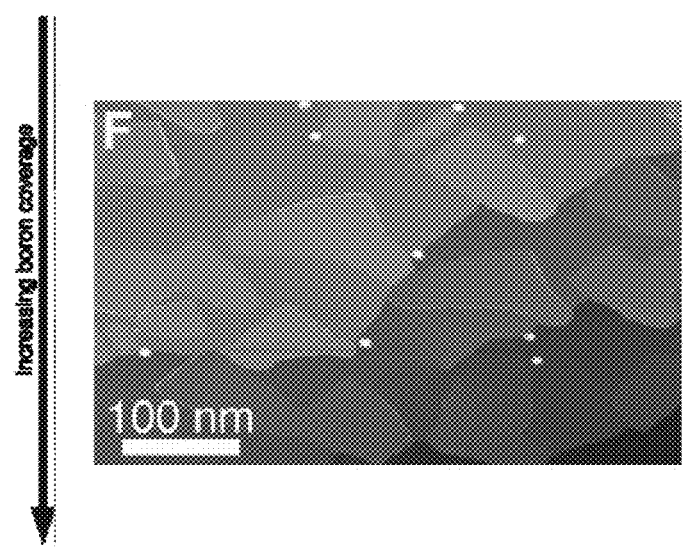
Figure 1G:
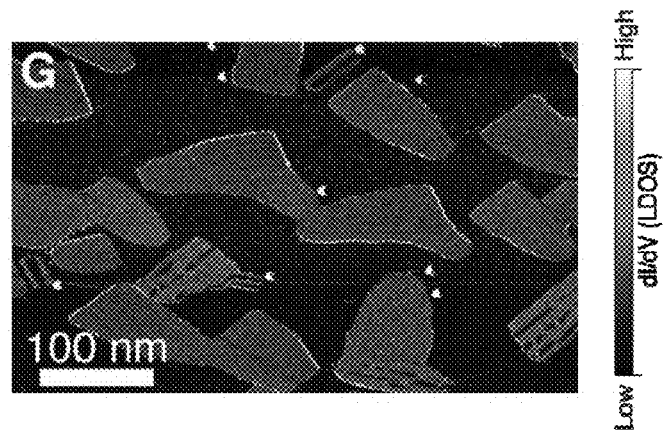
Figure 1H:
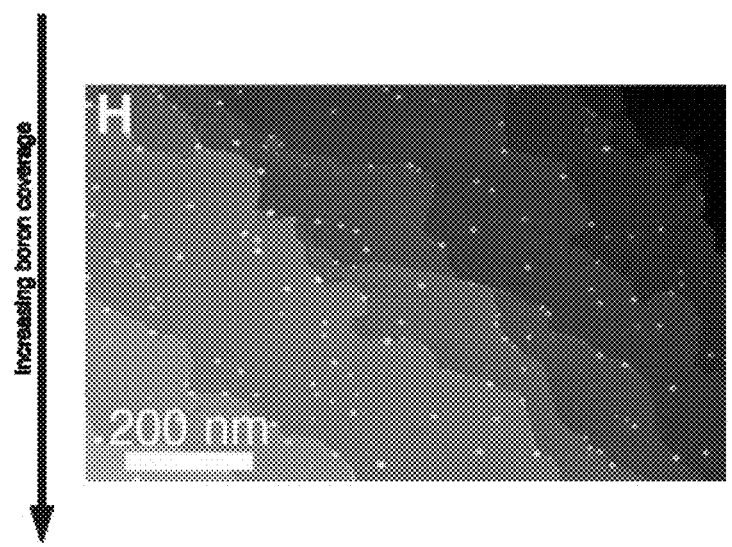
Figure 1I:
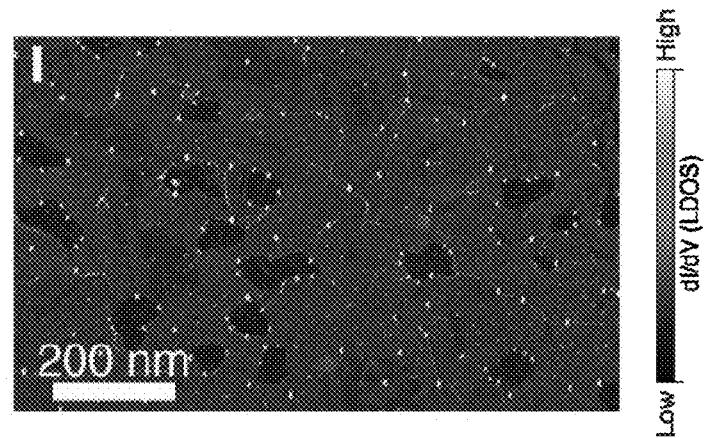
Figure 1J:
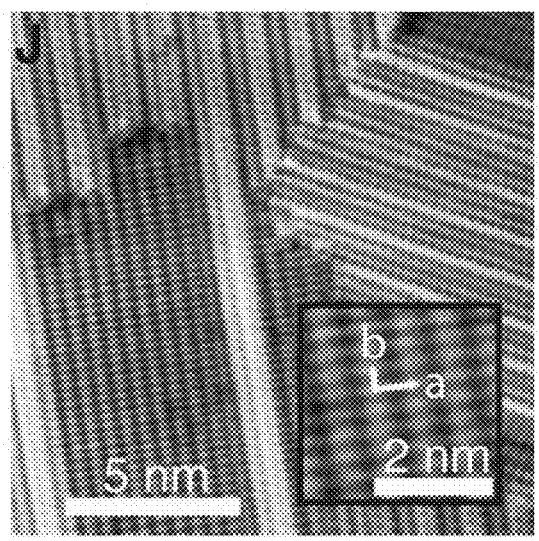
Figure 1K:
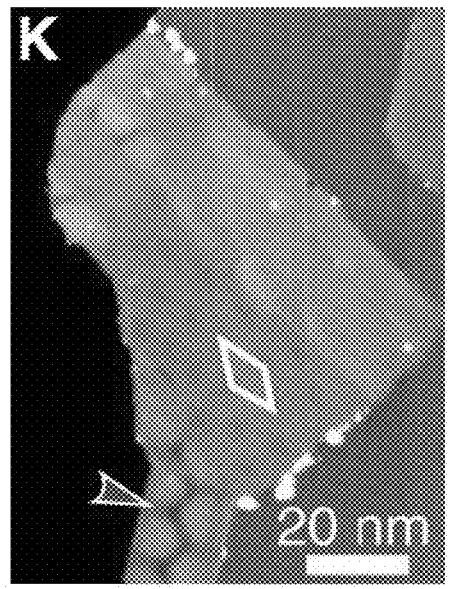
Figure 1L:
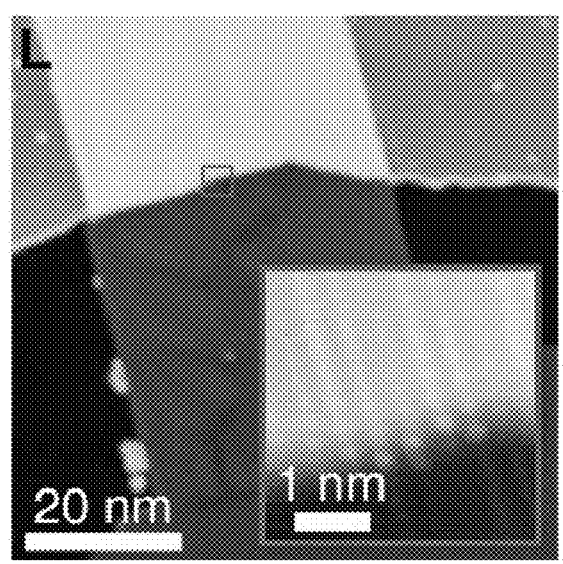
Figure 2A:
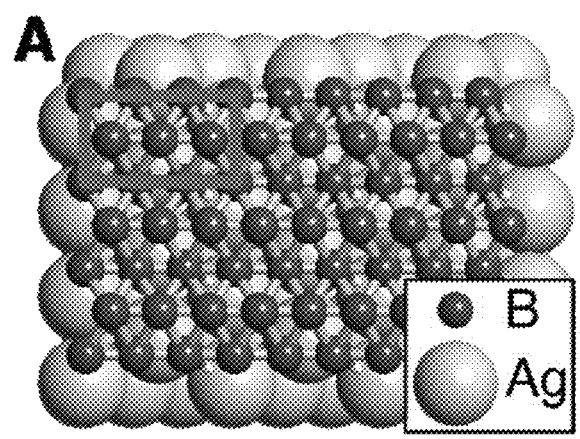
FIGS. 2A-F. Computational prediction of borophene structure and electronic properties. Top (A) and side (B) views of the low-energy monolayer structure (unit cell indicated by green box). (C) Simulated empty states STM image ($V_{sample}$=1.0 V), with overlaid atomic structure and unit cell of 0.500 nm by 0.289 nm and (D) experimental STM images ($V_{sample}$=0.1 V, $I_t$=1.0 nA), with overlaid unit cell of 0.51 nm by 0.29 nm. DFT calculated electronic (E) band structure (inset: 2D Brillouin zone) and (F) DOS for freestanding borophene FIGS. 3A-E. Borophene structural and chemical characterization. Cross-sectional AC-STEM images from (A) HAADF and (B) ABF detectors. (C) Juxtaposition (left to right) of Si-capped borophene structure model, simulated ABF image, and magnified ABF image. (D) XPS B is core level spectra and fitted components for samples with and without Si capping layers. (E) Angle-resolved XPS data acquired on Si-capped samples. Inset: schematic showing measurement angle and sample structure determined by angle-resolved XPS.
Figure 2B:
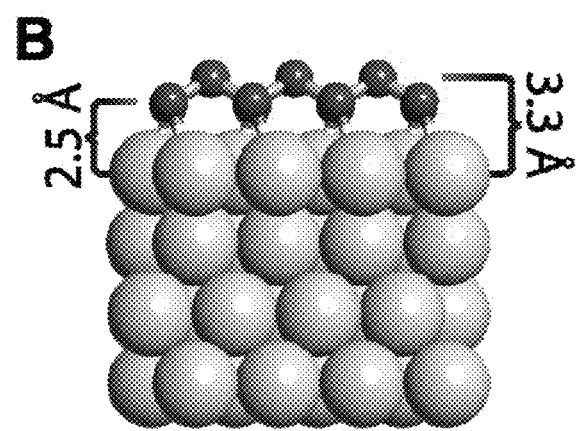
Figure 2C:
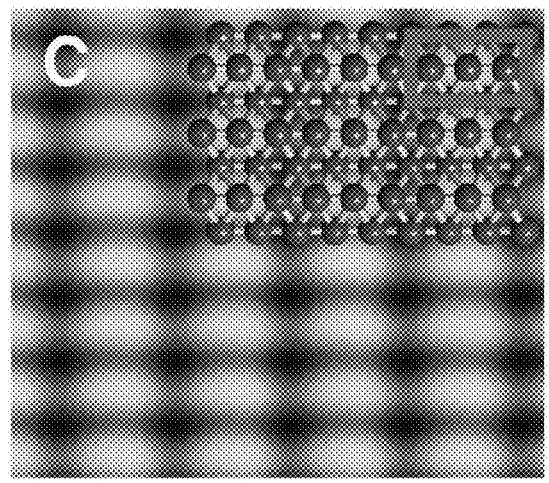
Figure 2D:
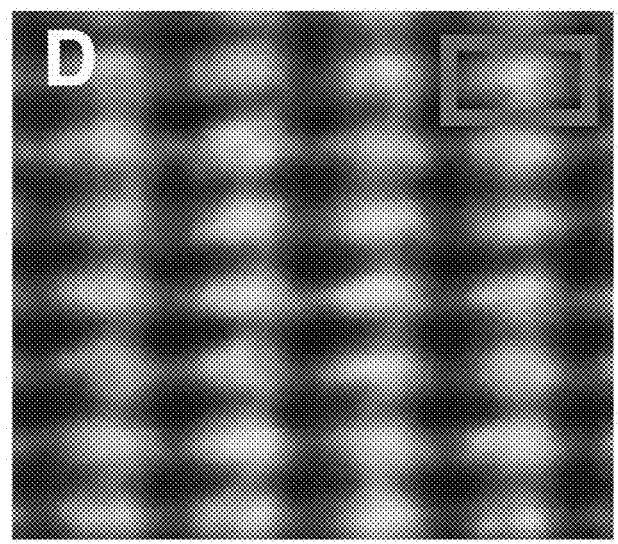
Figure 2E:
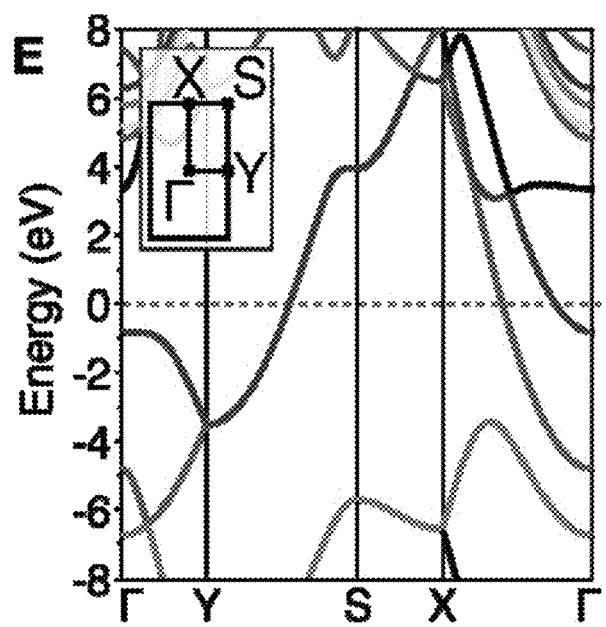
Figure 2F:
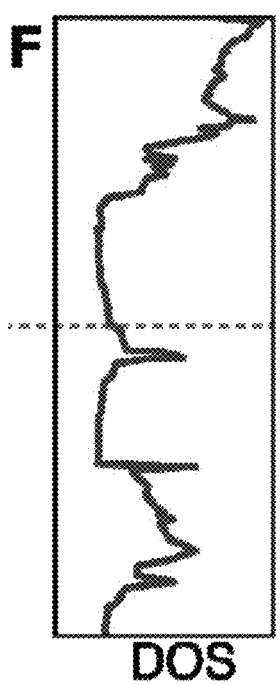

Frequently, borophene growth over the substrate step edges is observed (i.e., "carpet mode" growth, as in FIG. 1L. This continuity of the atomic-scale structure over the step (inset) suggests that the borophene is structurally distinct from the underlying substrate.

Figure 10:
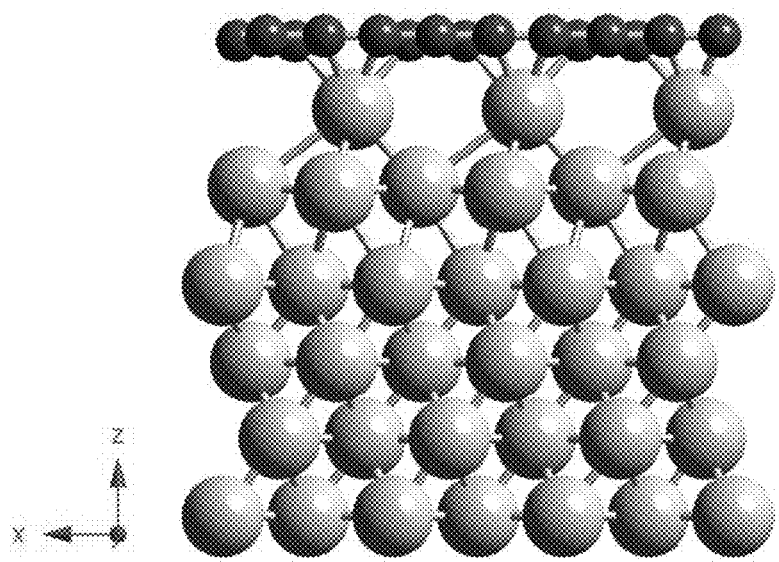
FIG. 10. Computational studies of alloying or boride formation (not observed). Sample structure model for boron-rich alloy (i.e., matching the experimental conditions), showing the restructuring of the near-surface silver region and segregation of the boron to the surface.
Figure 11A:
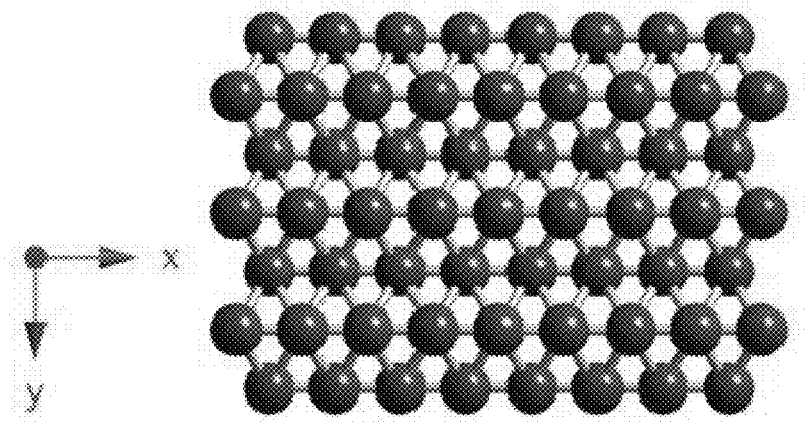
FIGS. 11A-H. Computational monolayer structures. (A,B,C) top, front, and side views of the atomic structure of a free-standing borophene sheet. Structural relaxation results in decreased corrugation along the a direction, which results in a decreased unit cell size. The resulting lattice parameters are a=0.1617 nm (corresponding to ~⅓ the lattice parameter in FIG. 2A,B) and b=0.2865 nm. (D) Phonon dispersion of freestanding borophene sheet. The small imaginary frequencies near the F point are consistent with instability against long-wavelength transversal waves(57). This instability can be fixed by defects, such as ripples or grain boundaries, which do not allow these waves by limiting the size of boron sheets. (E) Calculated strain vs. energy for freestanding borophene sheet. (F) Structure model corresponding to a metastable borophene sheet, slightly distorted with respect to the most stable structure (FIG. 2A). (G) Simulated ($V_{sample}$=0.1 V, $I_t$=3.0 nA) and (H) experimental ($V_{sample}$=0.1 V, $I_t$=3.0 nA) STM topography images.
Figure 11B:
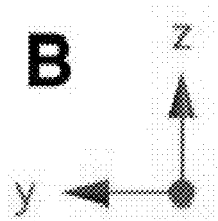
Figure 11B:
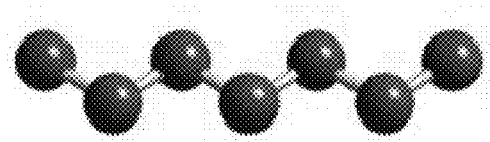
Figure 11C:
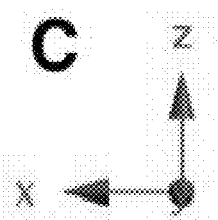
Figure 11C:
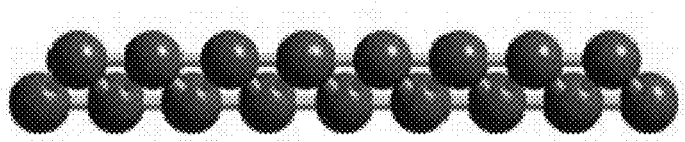
Figure 11D:
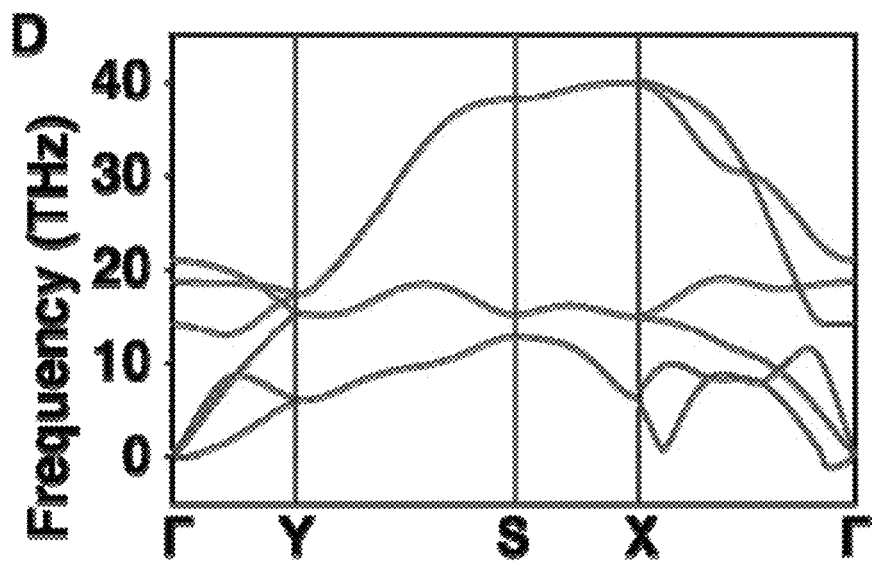
Figure 11E:
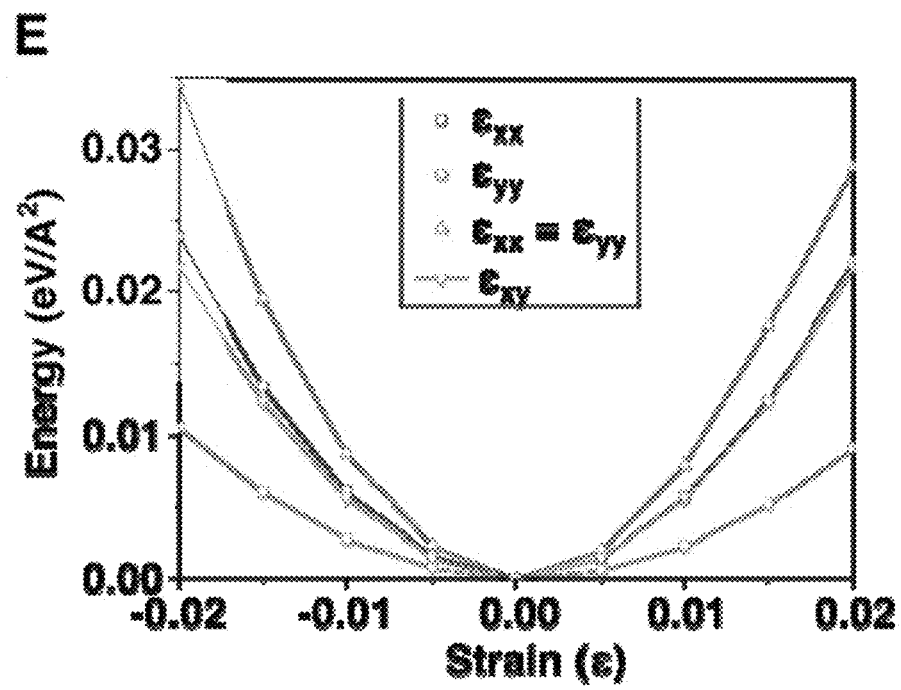
Figure 11F:
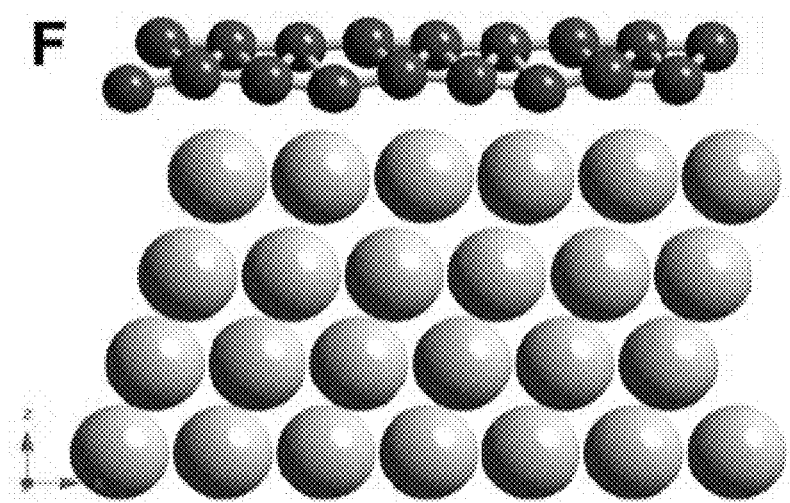
Figure 11G:
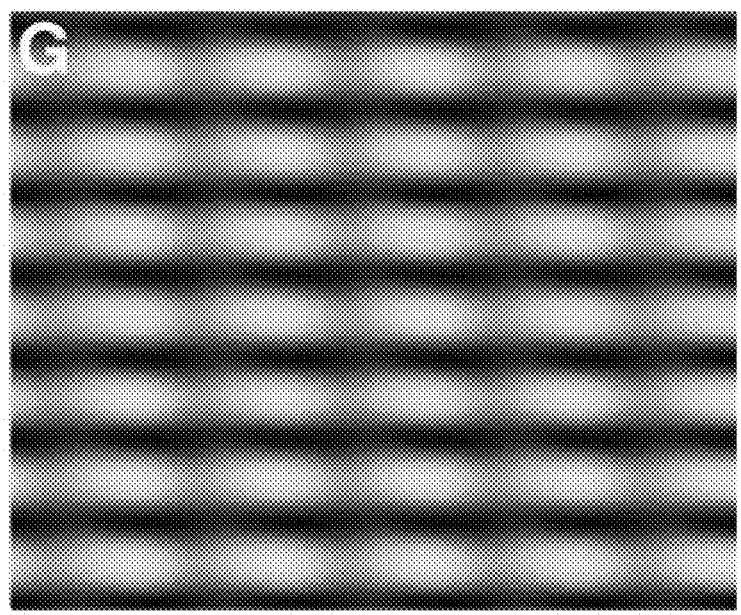
Figure 11H:
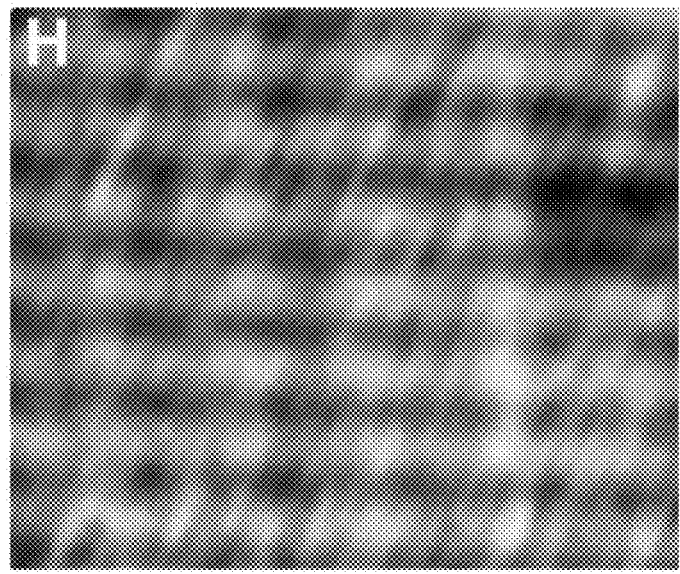
Figure 12A:
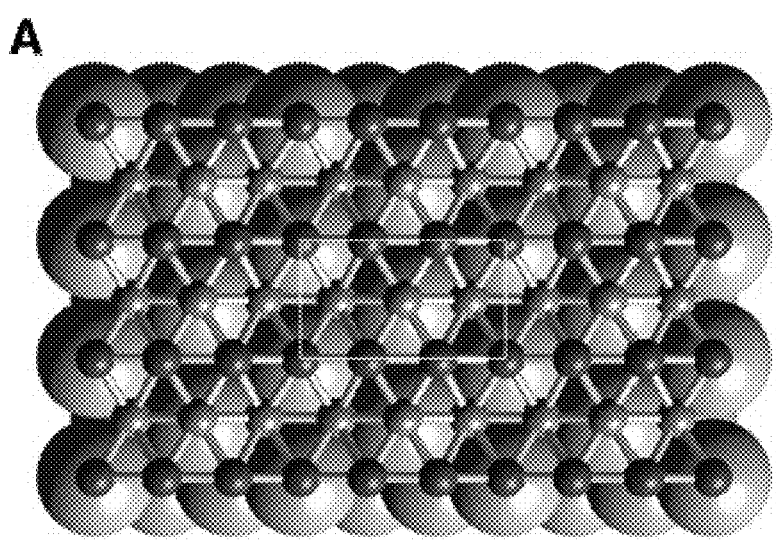
FIGS. 12A-F. Computational bilayer structures. (A,B,C) Top, side, and frontal views of bilayer borophene structure (not observed). Structural relaxation of the freestanding sheet results in lattice parameters of a=0.490 nm and b=0.288 nm. (D) Calculated electronic band structure for freestanding, bilayer borophene and (E) associated electronic density of states, both of which show metallic characteristics. (F) Calculated phonon dispersion for the bilayer structure. The small region of imaginary frequencies near the gamma point is interpreted as in FIG. 11.
Figure 12B:
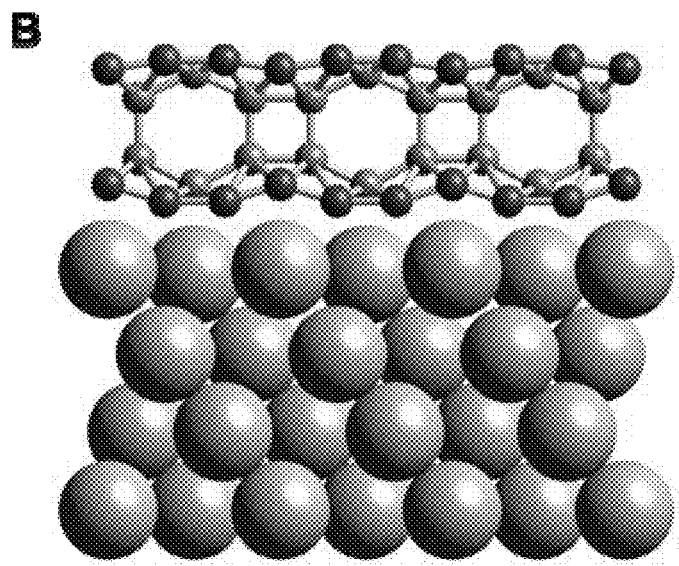
Figure 12C:
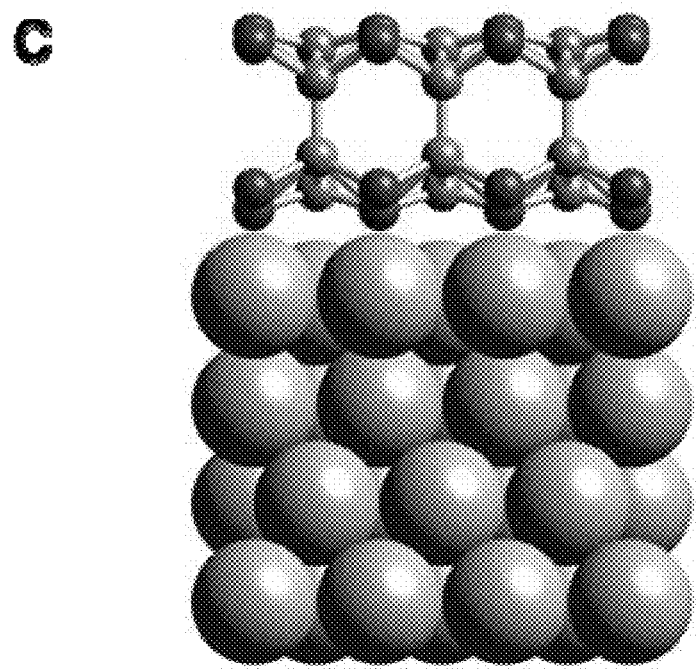
Figure 12D:
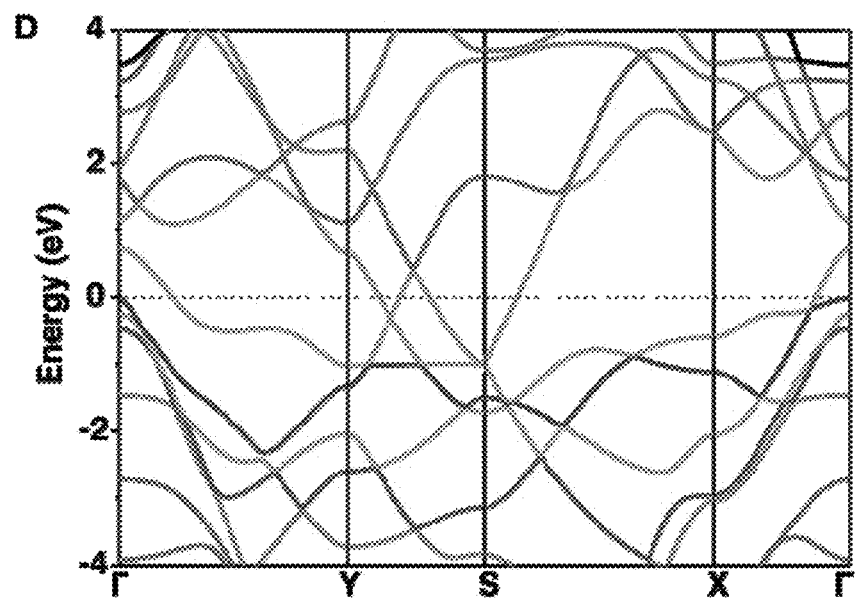
Figure 12E:
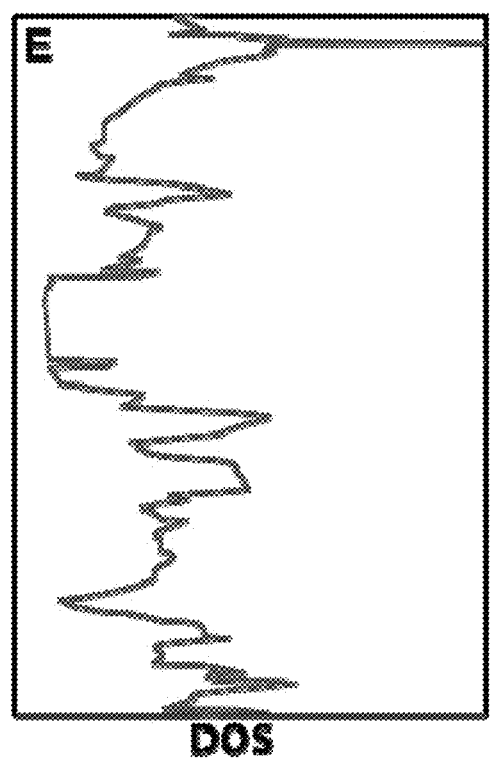
Figure 12F:
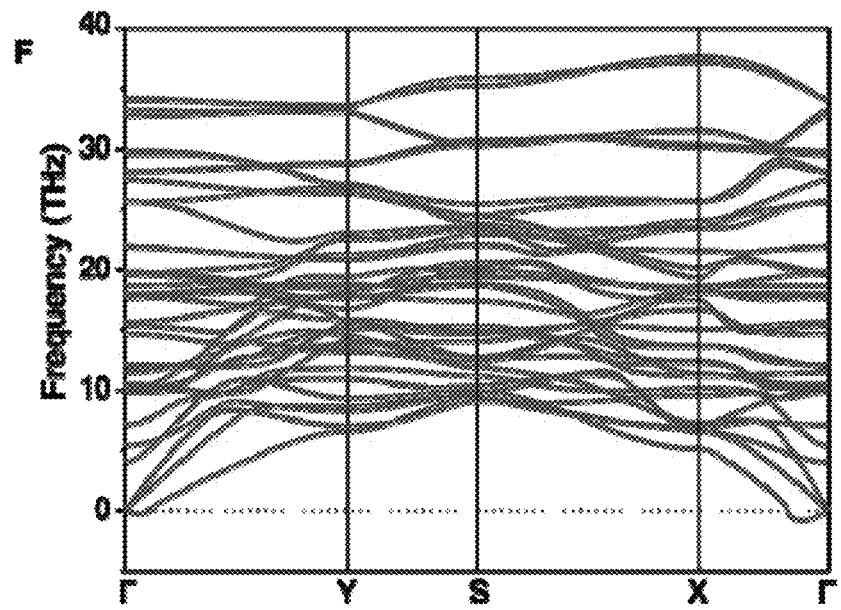

These experimental results are further elucidated by ab initio evolutionary structure prediction with the USPEX algorithm, which minimizes the thermodynamic potential of the system using density functional theory (DFT). Structures calculated with varying concentrations of Ag and B atoms on the Ag(111) substrate show surface segregation of B (FIG. 10), indicating that the formation of a B—Ag surface alloy or boride is highly improbable. Additional calculations predict likely monolayer (FIG. 11) and possible bilayer (FIG. 12) borophene structures on Ag(111), although height measurements, below, supported only a monolayer model.

The lowest energy monolayer structure is shown in FIGS. 2, A and B, and is constructible from distorted $B_7$ clusters using the Aufbau principle. The symmetry (space group Pmmn) and calculated lattice constants agree well with the STM data, with a and b equal to 0.500 nm and 0.289 nm, respectively. Comparison between simulated (FIG. 2C) and experimental STM topography images (FIG. 2D, also FIG. 11) gives excellent agreement, as does electron diffraction data (FIG. 7). Freestanding relaxation of this structure removes the slight corrugations along the a direction, but preserves the buckling along the b direction (FIG. 11). The freestanding sheet may exhibit instability against long-wavelength transversal thermal vibrations (FIG. 11), which may contribute to the observed stripe formation and would likely distort the structure of the borophene sheet upon removal from the growth substrate. This substrate-induced stability frames borophene as an intermediate class of templated, covalently bound sheets with properties distinct from conventional 2D materials and more consistent structure than supported silicon phases.

Electronic band structure calculations (FIG. 2E) within the 2D Brillouin zone of the relaxed, freestanding monolayer (inset) predict metallic conduction (i.e., bands crossing $E_f$) along the Γ-X and Y-S directions (parallel to the uncorrugated a direction). However, the out-of-plane corrugation along the b direction opens a band gap along the Γ-Y and SX directions. As a result, borophene is a highly anisotropic metal, where electrical conductivity is confined along the chains. The calculated DOS (FIG. 2F) is likewise metallic.

This structure also results in significant mechanical anisotropy (FIG. 11). Due to the strong, highly coordinated B—B bonds, the in-plane Young's modulus (a measure of stiffness) is equal to 170 GPa·nm along the b direction, and 398 GPa·nm along the a direction, which potentially rivals graphene, at 340 GPa·nm. Furthermore, the out-of-plane buckling results in negative values for the in-plane Poisson's ratio (equal to −0.04 along a and −0.02 along b), resulting in unusual properties such as in-plane expansion under tensile strain.

Figure 3A:
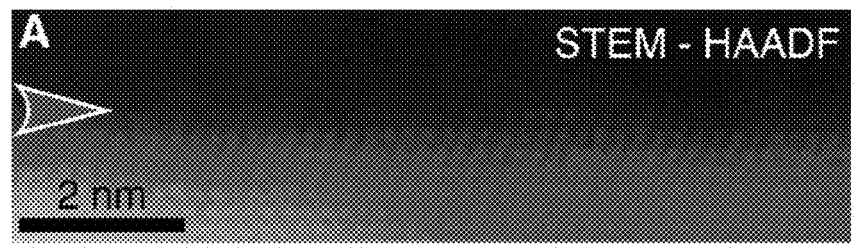
Figure 3B:
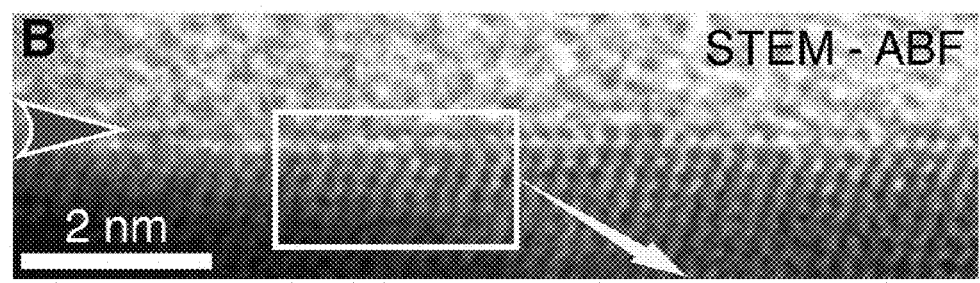
Figure 3C:
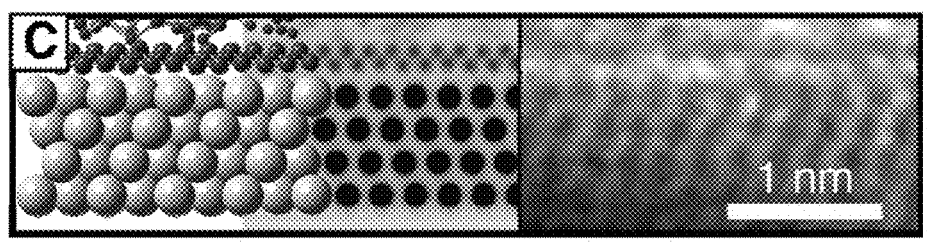
Figure 13A:
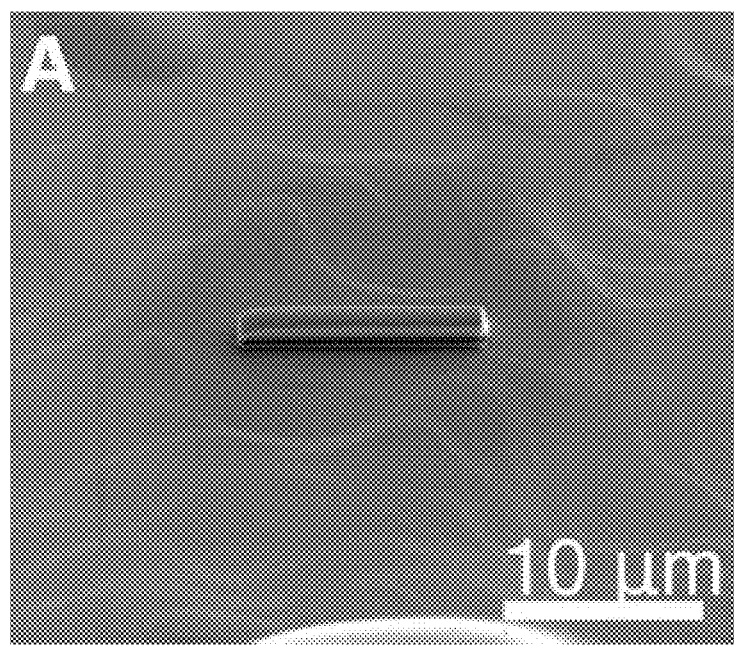
FIGS. 13A-C. Cross-sectional AC-STEM sample prep. SEM images acquired during focused ion beam (FIB) milling of a cross-sectional sample for STEM. Once a suitably flat region is selected, a protective platinum cap/handle is deposited in situ (A). The region surrounding the sample is then milled out using the $Ga^+$ ion beam (B). Immediately prior to severing the last connection of the sample to the substrate, the sample is welded to the tungsten probe via platinum deposition. Once the sample is separated from the substrate, it is transferred via the tungsten probe to the sample post of a semi-circular copper grid. The sample is welded to the post with platinum deposition, separated from the tungsten probe, and successively thinned to <30 nm by the ion beam (C).
Figure 13B:
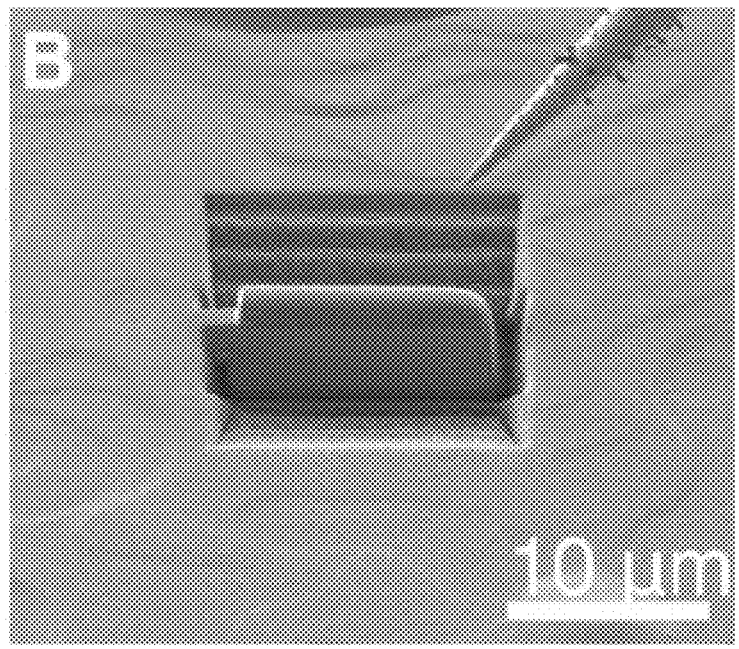
Figure 13C:
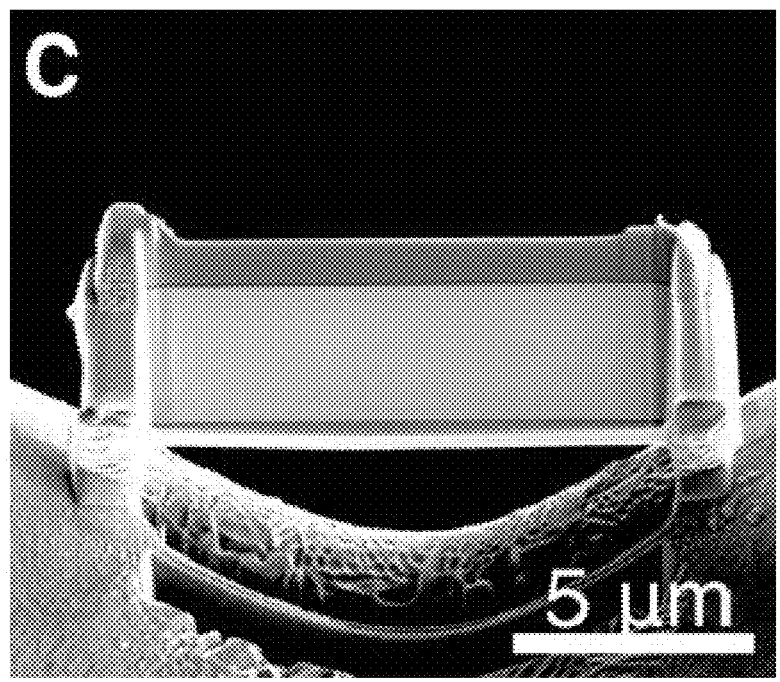

The apparent topographic height of the boron islands in STM depended upon scanning parameters, with the islands appearing as depressions for sample biases <3.2 V (compare the images in FIGS. 1, D and F). This observation is attributed to the inherent convolution between topography and electronic structure in STM measurements. Similar inversion is observed for NaCl islands and graphene on Ag(111). However, cross-sectional, aberration-corrected scanning transmission electron microscopy (AC-STEM) unambiguously shows that the boron phase is atomically thin and structurally distinct from the Ag(111) growth substrate. AC-STEM sample preparation is detailed in FIG. 13. Images acquired with the high-angle annular dark field (HAADF) detector (FIG. 3A) are sensitive to the atomic number Z (contrast $\sim Z^{312}$) and show minimal contrast at the interface between the Ag(111) substrate and amorphous $SiO_x$ capping layer, which is consistent with the lack of electron scattering from the low-Z boron. Nevertheless, electron energy loss spectra confirm that the boron lies at the Ag(111) surface (FIG. 15). Annular bright field (ABF) images (FIGS. 3B and 14), which are sensitive to light elements such as boron, revealed a planar structure (indicated by a purple arrow) at this interface. The observed contrast and structure are consistent with a simulated ABF image of the borophene structure model (FIG. 3C). Measured sheet thicknesses of ~0.27 to ~0.31 nm match both the monolayer structure model and multiwalled boron nanotubes.

Figure 16A:
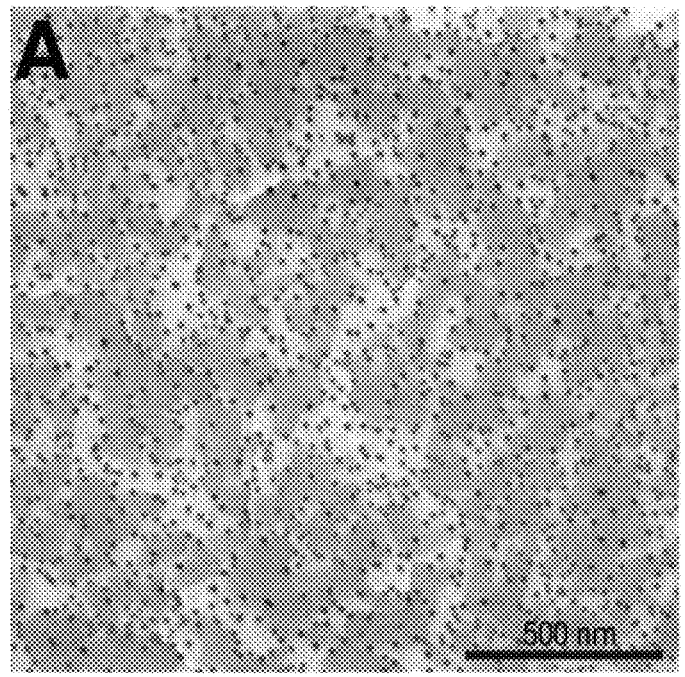
FIGS. 16A-C. Additional ex situ characterization of borophene. (A) SEM image of the borophene sheets after ambient exposure. The island features observed in STM persist and demonstrate significant contrast. The small dark features are attributed to boron nanoparticles, and may appear larger than in STM due to charging effects. (B) Ambient peak-force mode AFM image of borophene sheets. Based on the island morphologies, striped phase (red arrow) and homogeneous phase islands (blue arrow) are identified. (C) AFM line profiles extracted from (B), showing heights of ~0.38 nm for the striped phase island (red arrow) and ~0.44 nm for the homogeneous phase (blue arrow). These step heights may deviate from theoretical predictions due to tip-sample interactions and the partial oxidation of the sheets, but are essentially consistent with both theoretical predictions and STEM observations.
Figure 16B:
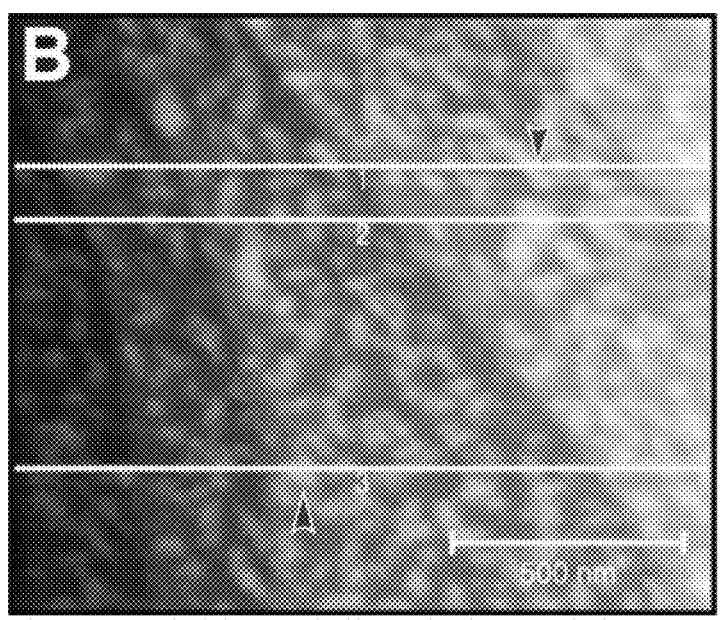
Figure 16C:
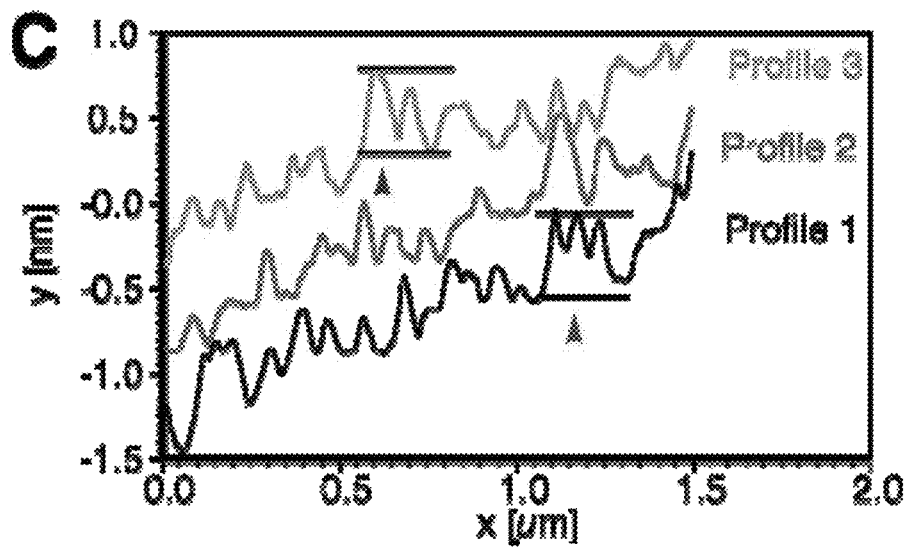

X-ray photoelectron spectroscopy (XPS) measures both sample composition and the oxidation state of the species present. Although the borophene islands persisted under ambient conditions (FIG. 16), the emergence of higher binding energy features in the XPS B is core level spectra (FIG. 3D) demonstrate that bare samples (black curve) were partially oxidized within several hours in ambient. However, this oxidation was impeded by an amorphous silicon/silicon oxide capping layer (red curve) thereon or about, which delayed oxidation for several weeks (blue curve). The unoxidized, capped and/or encapsulated sample is fit by two Voigt components, which reflect the differences in chemical environment between the low and high buckled atoms. Increasing the photoelectron detector angle from the sample normal enhances XPS surface sensitivity, thereby selectively probing the surface and subsurface. The normalized, integrated components of angle-resolved XPS spectra on silicon-capped borophene are plotted in FIG. 3E. With increasing emission angle, the relative intensities of the carbon, silicon, and boron peaks increased, whereas the silver peak diminished. These results confirm the structure shown in the inset schematic, corroborating our AES, STM, and STEM results. Additional XPS data are given in FIG. 17.

EXAMPLES OF THE INVENTION

The following non-limiting examples and data illustrate various aspects and features relating to borophene, related elemental boron allotropes comprising a layer of boron atoms and/or methods for their preparation, including the assembly of articles comprising borophene and/or such an allotrope, as are available through the synthetic methodologies described herein. In comparison with the prior art, the present borophenes, boron allotropes and related articles provide results and data which are surprising, unexpected and contrary thereto. While the utility of this invention is illustrated through the use of several articles, substrates and various borophene/elemental boron allotrope layers which can be used therewith, it will be understood by those skilled in the art that comparable results are obtainable with various other articles, substrates and borophene/boron allotrope layers, as are commensurate with the scope of this invention.

Materials and Methods.

Materials.

Growth and in situ experiments were conducted in a commercial ultrahigh vacuum (UHV) system (base pressure $\sim 10^{11}$ mBar) equipped with a preparation chamber, low-energy electron diffraction (LEED), Auger electron spectroscopy (AES), and scanning tunneling microscopy (STM). Borophene was grown on single crystal Ag(111) substrates (Mateck, 99.999%), which were cleaned via repeated cycles of Ar sputtering followed by annealing at 550° C. During growth, samples were heated to ~450° C. to ~700° C. by a button heater while boron was deposited from an electron beam evaporator (Focus Gmbh.) with a boron rod source (ESPI metals, 99.9999%). The deposition rate was maintained between 0.01 to 0.1 ML/min., using dual power sources to deliver 1.8-2.3 kV accelerating voltage and 1.5-1.9 A filament current. Using this setup, we obtain ~50 W incident power on a ~3 mm diameter boron rod. The flux was monitored using a faraday cup and periodic calibration on a clean Ag(111) crystal at room temperature. The boron rod was degased for >6 hours at ~50 W heating power, until the chamber pressure was $<5.0 \times 10^{-10}$ mBar during operation. However, depositions at pressures up to $\sim 2 \times 10^{-9}$ mBar showed no significant alteration in structure or morphology. The silicon capping layer for ex-situ analysis was deposited from an electron beam evaporator, using a solid silicon rod source (ESPI metals, 99.9999%) using 800 V accelerating voltage and ~1.8 A filament current to achieve ~15 W power incident on a ~1.5 mm rod. Degasing occurred at ~15 W for several hours, until the pressure was $<5.0 \times 10^{-10}$ mBar. The silicon was deposited on a cold sample, immediately following retrieval from the microscope at ~40 K.

In Situ Characterization.

STM measurements were conducted in an Omicron Nanotechnology VT-SPM at either 55 K or 300 K. All images presented are at 55 K, unless otherwise noted. STM measurements were acquired in constant current mode, using electrochemically etched W tips degassed in situ. In order to reduce apparent noise in some STM images, a Gaussian filter was applied with radii of 2-3 pixels (i.e., much smaller than the features of interest). Simultaneous dI/dV mapping during scanning and STS spectra were acquired using the lock-in technique (10 kHz modulation, 30 mV amplitude). LEED and in situ AES employed a 4-grid detector (Omicron SpectraLEED), and AES was acquired with incident beam energy of 1.5 keV and a lock-in modulation of 2.0 V peak-to-peak. AES spectra were charge-corrected to the position of the elastic primary peak at 1500 eV.

Ex Situ Characterization.

Scanning electron microscopy (SEM) and focused ion beam (FIB) milling were performed in a FEI Helios system. FIB samples were milled with a $Ga^+$ ion beam. TEM samples were prepared by FIB and stored under inert atmosphere. Aberration-corrected scanning transmission electron microscopy (AC-STEM) imaging and electron energy loss spectroscopy (EELS) were performed using a JEOL ARM 200F microscope equipped with a Gatan GIF 863 Tridiem spectrometer system operating at 200 kV. Care was taken to minimize the electron beam exposure to the sample, in order to reduce electron beam-induced modification of the Ag(111) substrate. High-angle annular dark field (HAADF) and annular bright field (ABF) images were sequentially acquired to provide complementary information concerning the sample composition. The Gatan spectrometer was set to an energy dispersion of 0.5 eV/channel, in order to obtain the best energy resolution at the zero-loss peak. EELS spectra were acquired using the scanning mode to obtain a line profile spectra set to at the same energy as the zero-loss peak, with a 2.0 mm aperture and a 10 ms pixel time per 1.0 nm of the sample to increase the signal obtained from the boron (188 eV) at the interface. The DeConvEELS software package was applied to rectify the EELS spectra by deconvolution with a zero-loss spectrum (thereby acting as a software monochromator). Ambient AFM measurements were performed on a Bruker Multimode system in Peakforce mode using silicon tips with a nominal<10 nm radius of curvature. XPS measurements were acquired in a Thermo Scientific ESCALAB 250Xi, using an electron flood gun for charge compensation. All XPS data were resolved with ~0.1 eV resolution employing a monochromated Al Kα X-ray source at ~1486.7 eV (~400 µm spot size). General core level spectra were the average of 5 scans with a 100-350 ms dwell time, using a pass energy of 15 eV. For angle-resolved XPS (AR-XPS), the sample stage was tilted with respect to the x-ray source and photoelectron detector, while single spectra were taken at each angle. AR-XPS core level spectra data as presented were taken with pass energies of 50 eV, and the results confirmed with 15 eV pass energy spectra. When using charge compensation, all core levels were charge corrected to adventitious carbon at ~284.8 eV. All subpeaks were fitted with singlets for s photoelectrons, using the software suite Avantage (Thermo Scientific).

Computational Methods.

Ab initio structure predictions were performed using the USPEX code with surface prediction module. The Ag(111) substrate was constructed by rectangular and hexagonal lattices, respectively. The lattice vectors are a=5.004 Å and b=2.889 Å for rectangular lattice and a=b=5.778 Å for hexagonal lattices. The structure searches were conducted with 6, 8, 10, 12, 14 and 16 atoms per unit cell for the hexagonal substrate; and 6, 7, 8, 10, 12, 14, 16 atoms per cell for the rectangular lattice, respectively. The thickness of the surface layer of two-dimensional (2D) boron and the vacuum were set to 3 Å and 10 Å during the searching, but allowed to change for postprocessing. To investigate the likelihood of alloy formation, a structure search was performed with the rectangular lattice by varying the number of Ag and B atoms between values of up to 8 and 16 atoms. The chemical potential for Ag and B are −2.82 eV/atom and −6.68 eV/atom, respectively. The structural relaxations used the all-electron-projector-augmented wave method as implemented in the Vienna ab initio simulation package (VASP). The exchange-correlation energy was treated within the generalized gradient approximation (GGA), using the functional of Perdew, Burke, and Ernzerhof. The cutoff energy of 450 eV and the uniform Γ-centered k-points grids with resolution of 2π×0.04 Å$^{-1}$ were used. Phonon dispersion curves and the simulated scanning tunneling microscopy (STM) images were computed with the PHONOPY package and Hive code.

The change of energy was calculated in the strain range (between −2% and 2% with an increment of 0.5%) to determine the mechanical properties of the 2D boron sheet. For a 2D sheet, using the standard Voigt notation, the elastic strain energy per unit area can be expressed as $$U(\varepsilon) = \tfrac{1}{2} C_{11} \varepsilon_{xx}^2 + \tfrac{1}{2} C_{22} \varepsilon_{yy}^2 + C_{12} \varepsilon_{xx} \varepsilon_{yy} + 2 C_{66} \varepsilon_{xy}^2$$

where $C_{11}$, $C_{22}$, $C_{12}$, and $C_{66}$ are components of the elastic modulus tensor, corresponding to the second partial derivative of strain energy with respect to strain. The elastic constants can be derived by fitting the energy curves associated with uniaxial and equibiaxial strains. When this method was applied for penta-graphene, calculated $C_{11}$ and $C_{12}$ as 288 GPa·nm and −32 GPa·nm were obtained, which are in good agreement with the reported values (265 and −18 GPa·nm). For the 2D boron sheet, the corresponding $C_{11}$, $C_{22}$, $C_{12}$, and $C_{66}$ are 398, 170, −7, and 94 GPa·nm, respectively (from fitting to FIG. 11E). The in-plane Young's modulus and Poisson's ratio can be derived from the elastic constants by $$E_x = \frac{C_{11}C_{22} - C_{12}C_{21}}{C_{22}}, \quad E_y = \frac{C_{11}C_{22} - C_{12}C_{21}}{C_{11}},$$

$$v_{xy} = \frac{C_{21}}{C_{22}}, \quad v_{yx} = \frac{C_{12}}{C_{11}}$$

Therefore, the Young's modulus and Poisson's ratio are 398 GPa·nm, −0.04 in the x direction (i.e., parallel to the a vector), and 170 GPa·nm, −0.02 in they direction (i.e., parallel to the b vector). Most strikingly, the in-plane Young's modulus in the x direction is comparable to or even exceeding that of graphene (340 GPa·nm). Moreover, the 2D boron sheet has a negative $C_{12}$, leading to be the first 2D boron structure with negative Poisson's ratio due to the special buckled atomic configuration.

AC-STEM images were simulated with the JEMS software package, using parameters matching the experimental conditions. An amorphous silicon capping layer (generated using a-Si Generator) was added to the predicted structure in order to better model the contrast of the sample.

Example 1

Auger Electron Spectroscopy.

Auger Electron Spectroscopy (AES) in situ verified the cleanliness of the surface before deposition, and the chemical identity of the samples following STM measurements. Auger transitions respond to changes in the local chemical environment due to shifts in both the valence and core level energies. The formation of compounds generally results in shifts of at least several eV. Low atomic number elements like boron are especially susceptible to these shifts.

Figure 5A:
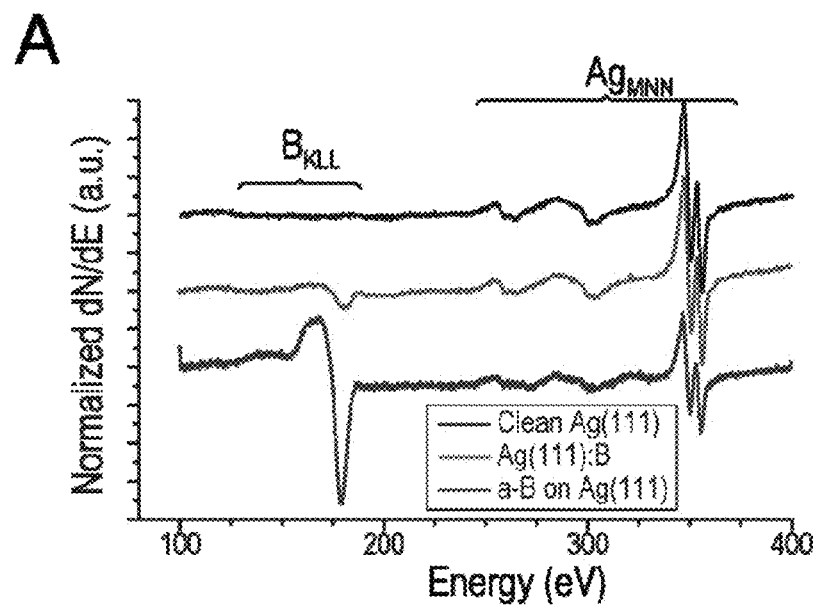
FIGS. 5A-B. Auger electron spectroscopy analysis and discussion. (A) AES spectra of clean Ag(111), borophene (~1 ML) grown at 550° C., and a thicker (~4 ML) amorphous boron film. (B) AES spectrum of borophene film with extended range, demonstrating the absence of impurity peaks.
Figure 5B:
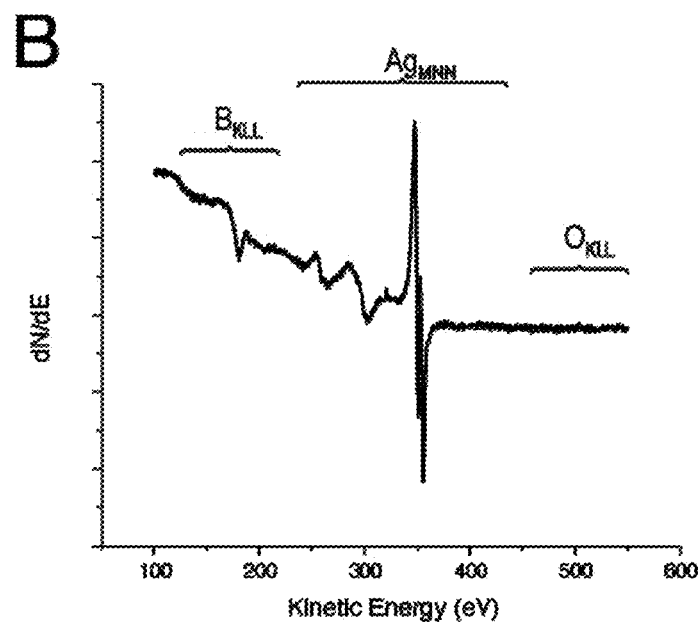
Figure 6A:
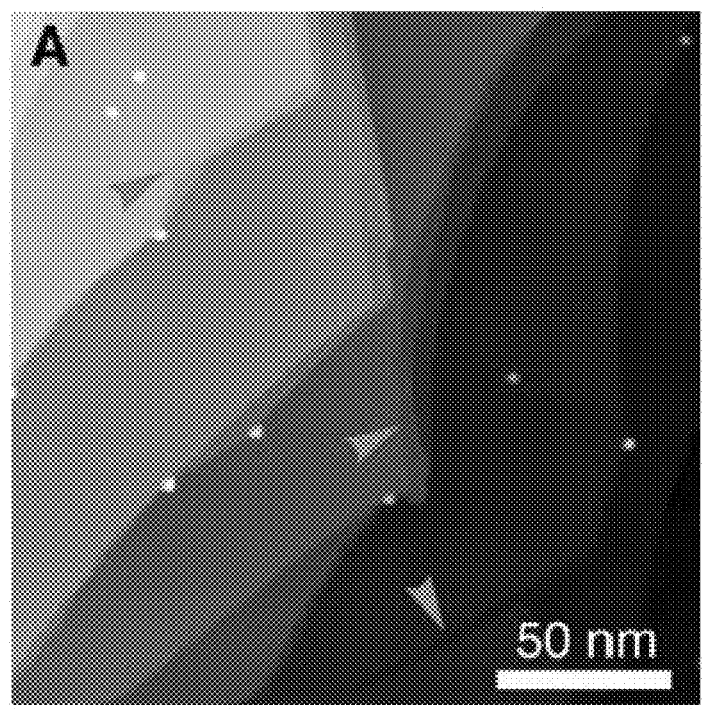
FIGS. 6A-D. Formation of borophene nanoribbons. STM topography images of low-flux (~0.02 ML/min), low-coverage deposition at 550° C. showing (A) large scale region with several nanoribbons at step edges (blue arrows) and within terraces (blue arrow). ($V_{sample}$=1.0 V, $I_t$=200 pA) (B) Magnified image demonstrating the internal striped structure of the nanoribbons. ($V_{sample}$=0.2 V, $I_t$=500 pA) (C) Atomic scale structure of the nanoribbons, demonstrating their structural correspondence with the extended 2D stripe phase sheets. ($V_{sample}$=−0.1 V, $I_t$=5 nA). (D) STS point spectra obtained on the rectangular lattice phase regions of the striped boron nanoribbons, demonstrating their metallic characteristics.
Figure 6B:
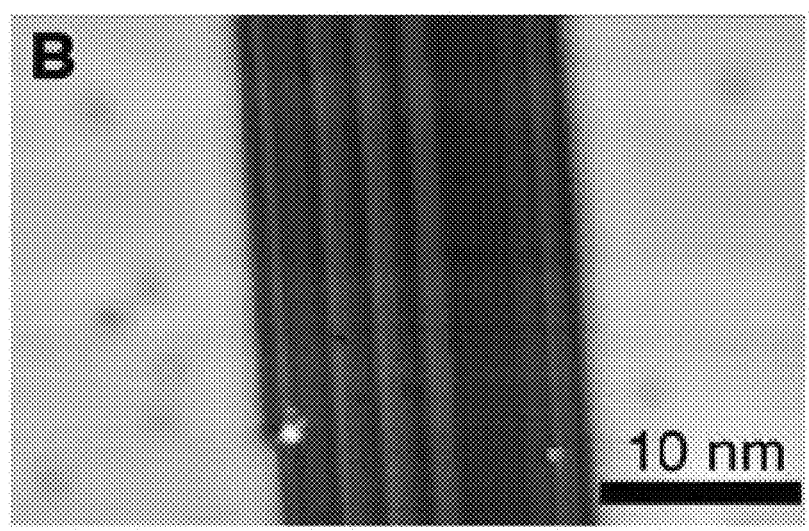
Figure 6C:
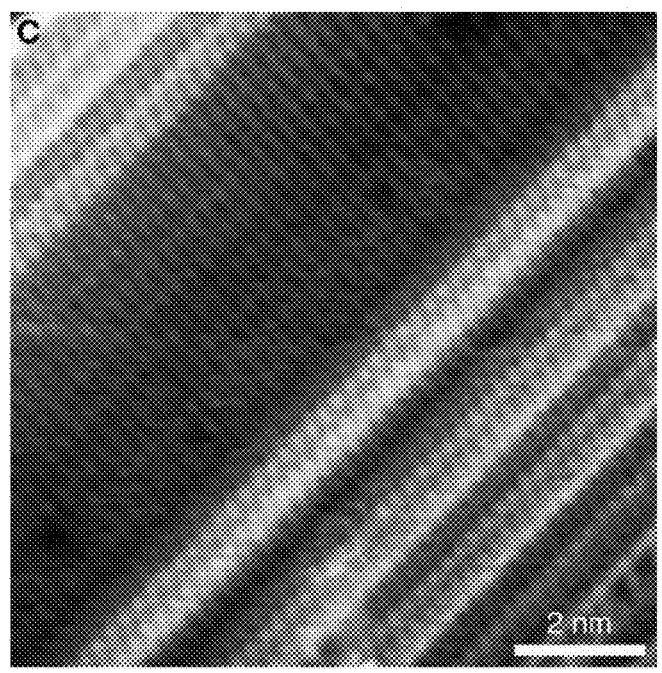
Figure 6D:
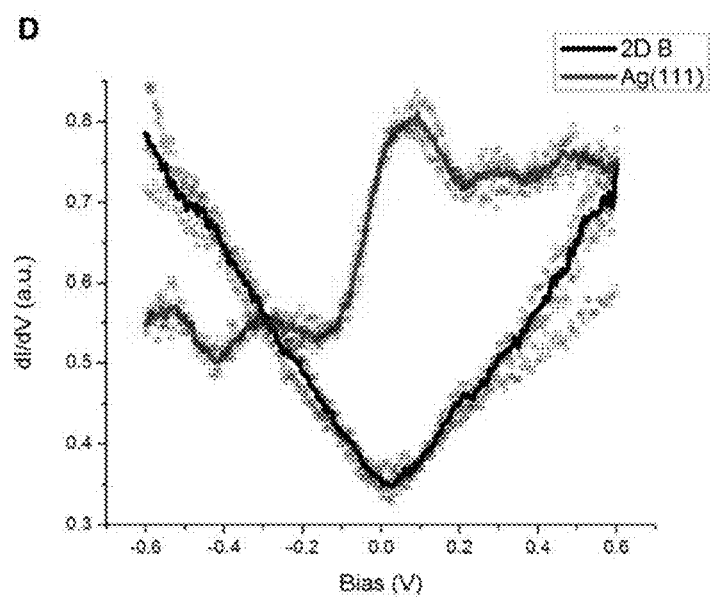

Representative AES spectra obtained on clean Ag(111), Ag(111) with borophene, and Ag(111) with a thicker (~4-6 ML) amorphous boron film are presented in FIG. 5A. In the clean Ag(111) spectrum, the characteristic Ag MNN spectrum is observed, with sharp peaks at 351 and 356 eV and broad secondary peaks at 263 and 303 eV. Boron deposition does not noticeably modify the silver peaks, indicating there was no substantial chemical modification to the surface (i.e., no alloying or compound formation). Following the deposition of 1 ML at a substrate temperature of 550° C. (red curve), the boron KLL peak is clearly observed at the expected 180 eV. Comparison with relatively thick, amorphous boron (deposited at room temperature) shows no extra peaks or peak shifts, which confirms that the measured boron KLL peak position corresponds to unreacted, pure boron.

No additional peaks due to contaminants or oxygen were observed (~500 eV, see FIG. 5B), and the absence of carbon was verified through the ratio of the silver 266 eV and 304 eV peaks (typical measured value of 0.42 before and after boron deposition). The presence of even slight carbon contamination would significantly distort the Ag peaks in dN/dE spectra. Furthermore, the peak shape does not change following deposition, suggesting that no carbon contamination is introduced by the boron source.

Example 2

Low Energy Electron Diffraction.

Spatially averaged atomic structural data is obtained through in situ low-energy electron diffraction (LEED). In LEED, the magnitude of the reciprocal space scattering vector q is given by $$|\vec{q_{hk}}| = \frac{1}{|\vec{G_{hk}}|}$$

where $G_{hk}$ represents the real-space translation vector of the surface and h and k represent the indices of the diffraction spot. The sampled region of reciprocal space is inversely proportional to the electron de Broglie wavelength; therefore, higher electron energy images larger reciprocal lattice vectors (i.e., smaller real space distances).

Figure 7A:
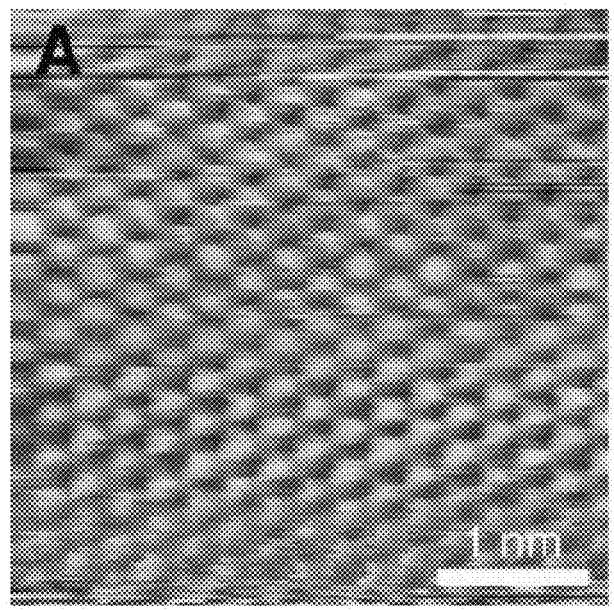
FIGS. 7A-G. Structure analysis and low energy electron diffraction of borophene. Sequentially acquired STM topography of (A) Ag(111) lattice ($V_{sample}$=25 mV, $I_t$=1.0 nA) and (B) borophene ($V_{sample}$=50 mV, $I_t$=2.0 nA). (C) Superimposed fast Fourier transformations (FFTs) of (A) and (B). (D) FFT of low-energy monolayer structure model given in FIG. 2 (shown inset). This FFT is not scaled to (C), comparison is made relative to the Ag(111) spots (circled in red). (E,F,G) LEED patterns acquired at (E) 120 eV, (F) 68.5 eV, and (G) 68.5 eV. (E) and (F) were acquired sequentially on the same 550° C. growth, whereas (G) was acquired on a lower deposition rate growth at 700° C.
Figure 7B:
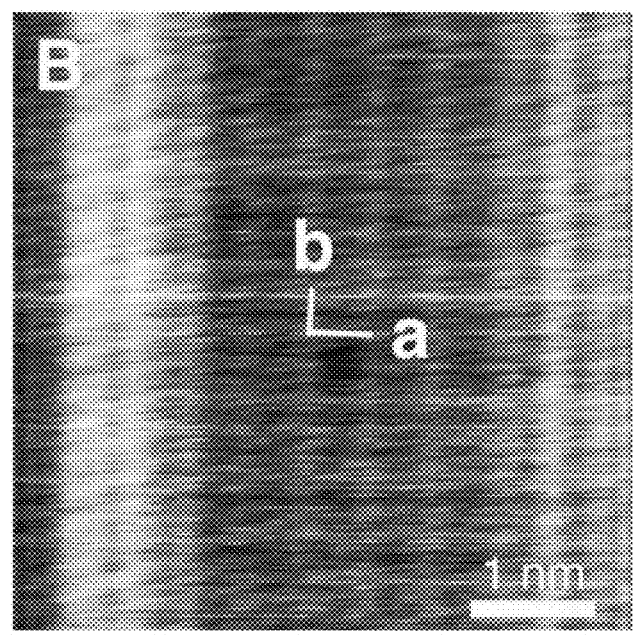
Figure 7C:
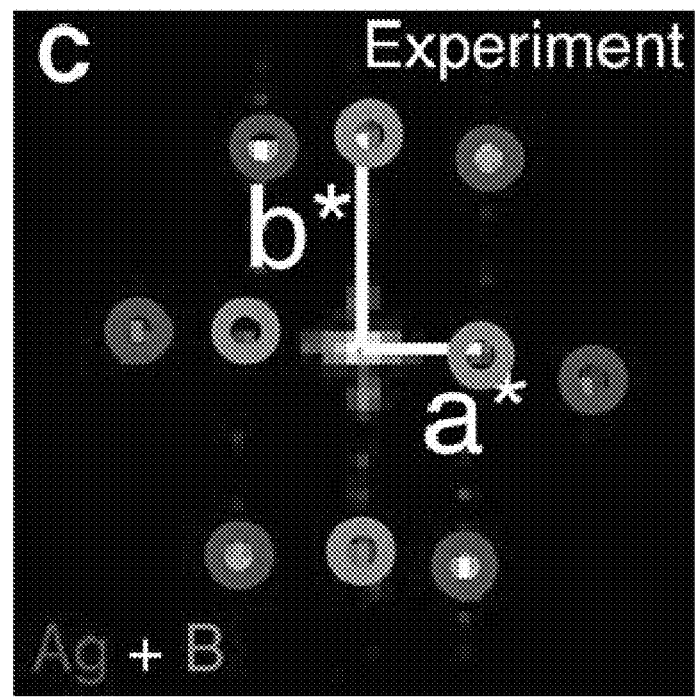
Figure 7D:
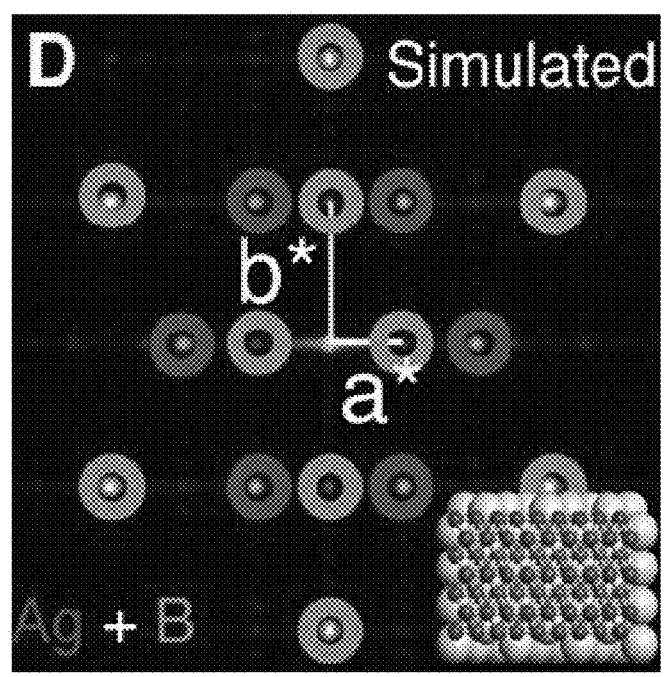

Reciprocal space structural data are also obtained by performing a fast Fourier transform (FFT) on STM images. FIGS. 7A and 7B show sequentially acquired topography images of the Ag(111) surface and a nearby region of striped/rectangular phase. FIG. 7C shows the superposition of FFTs on FIGS. 7A and 7B, where the spots related to the Ag(111) and boron structures are highlighted in red and blue, respectively. The borophene reciprocal lattices vectors are indicated. For comparison, FFTs on the calculated structure model (FIG. 2A, 2B) are given in FIG. 7D. This calculated pattern corresponds very well to the experimentally acquired FFT, showing the same relationships between the Ag(111) and borophene spots. Additional spots related to the atomic structure of the borophene are indicated in this model.

Figure 7E:
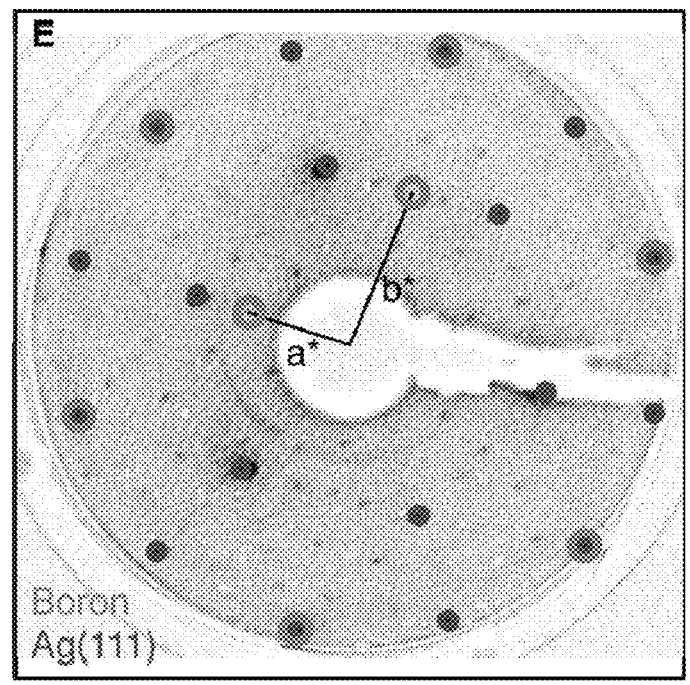
Figure 7F:
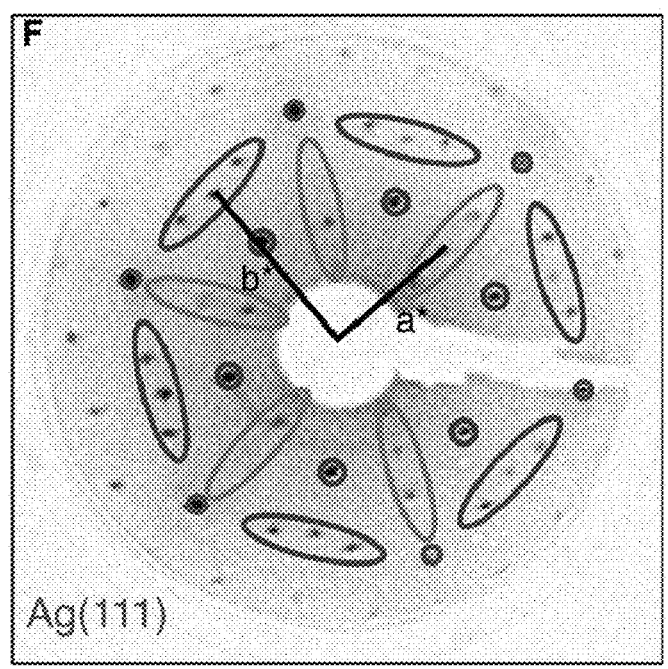
Figure 7G:
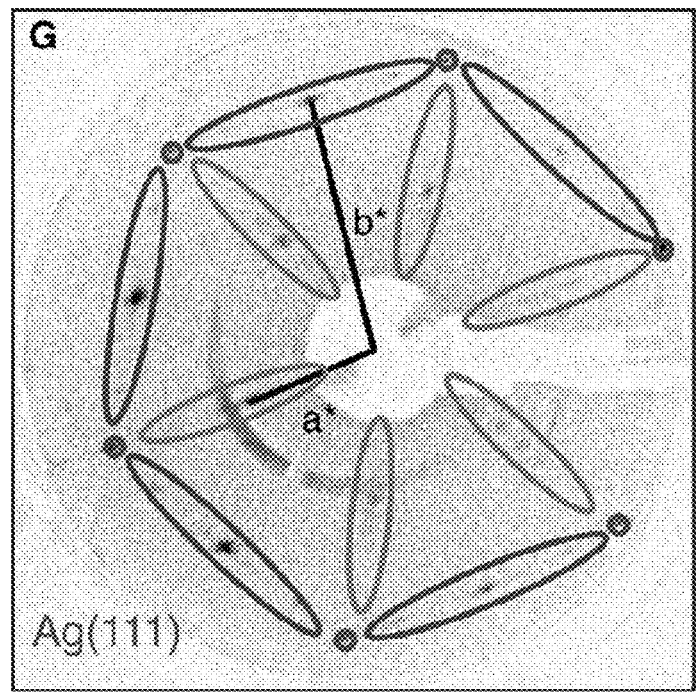

These FFT patterns matched the data acquired through LEED, as in FIG. 7E, which showed apparent six-fold symmetry for the borophene sheets. The strong diffraction spots circled in red are related to the Ag(111) 1×1 surface, whereas the blue spots are related to the structure of the borophene. The apparent six-fold symmetry of these additional spots results from the three possible orientation of the boron sheets (observed in STM). The additional spots are related to the Moiré pattern and buckling of the boron sheets. Lower energy LEED (68.5 eV, FIG. 7F) shows these spots more clearly. The spots highlighted in orange are due to the a* periodicity, or the formation of the striped domains. Similarly, the spots circled in purple are related to the buckling along the b* direction. In the case of the rectangular lattice, these correspond to a 1×3 reconstruction of the relaxed freestanding structure or rectangular 2×(√3/2)R30° with respect to the substrate. The spots circled in blue correspond to the short-range, rhombohedral Moiré pattern in the homogeneous phase, which results in a √3×√3R30° symmetry relative to the substrate. Many of the lower q-space magnitude (i.e., larger real-space distance) spots are somewhat less well defined, consistent with the variable periodicities of buckling in the stripe phase. The buckling reconstruction parameters for the most ordered stripe patterns in the STM are discussed. Deposition at a slower rate (FIG. 7G) results in a more ordered LEED pattern and elimination of the 3×√3R30° spots due to increased conversion of the homogeneous phase to the striped phase.

Example 3

Structure and Morphology of the Homogeneous Phase.

Figure 8A:
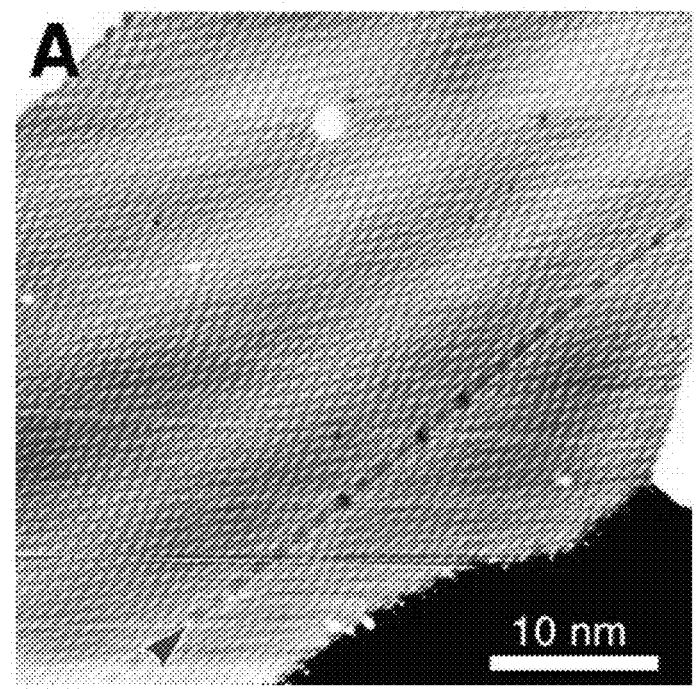
FIGS. 8A-D. Detailed structure and morphology of the homogeneous phase. STM topography images of (A) Atomically resolved homogeneous phase demonstrating chain morphology, line defect, and Moiré structure ($V_{sample}$=0.1 V, $I_t$=500 pA). (B) Atomically resolved image of typical chain structure. The short-range Moiré pattern is highlighted with a white rhombus ($V_{sample}$=0.1 V, $I_t$=3.0 nA). (C,D) Atomically resolved images of (C) typical chain structure ($V_{sample}$=0.1 V, $I_t$=1.0 nA) and (D) magnified region (from green square) demonstrating bias-dependent changes in contrast which reveal structural relationships between the chains ($V_{sample}$=−20 mV, $I_t$=1.0 nA).
Figure 8B:
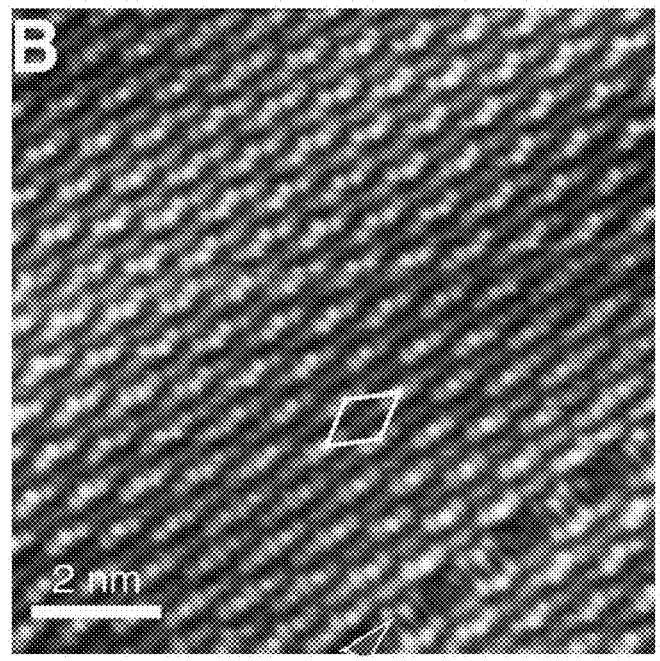
Figure 8C:
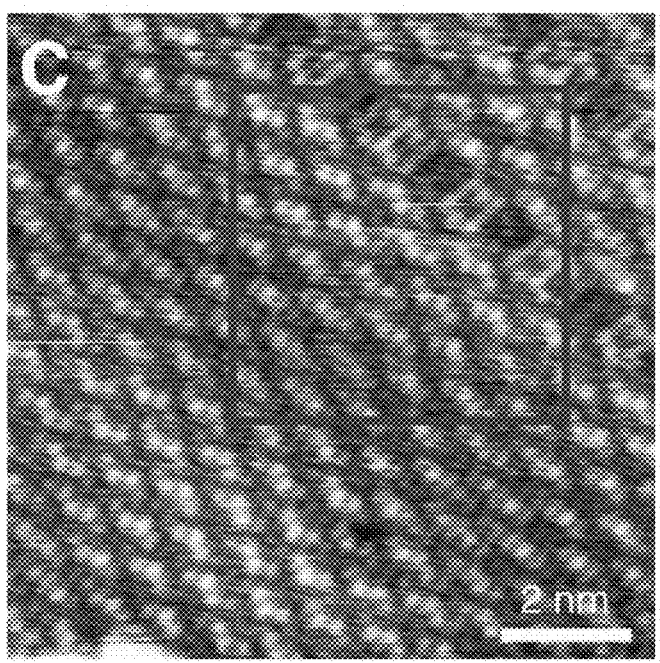
Figure 8D:
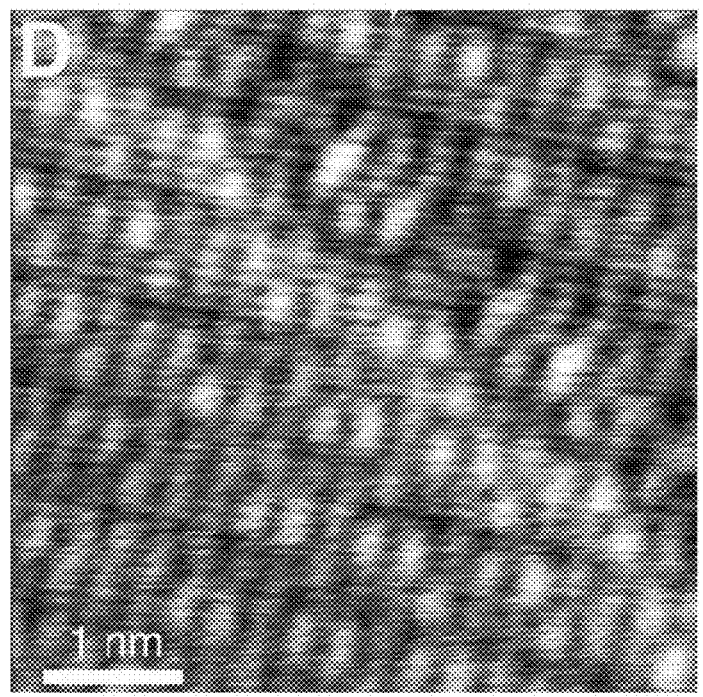

Several grains of the homogeneous phase are shown in FIG. 1D,E. Homogeneous phase islands typically exhibit truncated triangle or truncated oval (i.e., "bullet-like") shapes. No homogeneous phase islands were observed for growth at 700° C., suggesting that high temperature and/or slow deposition enable the kinetically limited phase transformation from the homogeneous phase to the striped phase to proceed. Although the homogeneous phase islands often appear featureless at the large scale, they exhibit multiple scales of Moiré pattern, including a ~0.9 nm rhombohedral pattern, and one-dimensional Moiré patterns with ~8 nm periodicity, as in FIG. 8A,B. The 1D Moiré pattern correlates to variations in the degree of lateral distortion of the chain features in the atomic-scale structure (FIG. 8B). Concurrent with this chain structure, bias dependent imaging reveals additional structure connecting adjacent chains (FIG. 8C), which implies that the buckled atomic chain structure typically observed likely only captures the structure of the highest protruding features. Frequently 1D line defects are observed, as in FIG. 8A-D. These defects sometimes appear as anti-phase boundaries in terms of the inter-chain lateral distortions (i.e., the direction of the lateral distortions is opposite), which may result in strain relief or serve to nucleate the proposed phase transition from homogeneous to striped phase.

Example 4

Striped Phase Structure and Morphology.

Figure 9A:
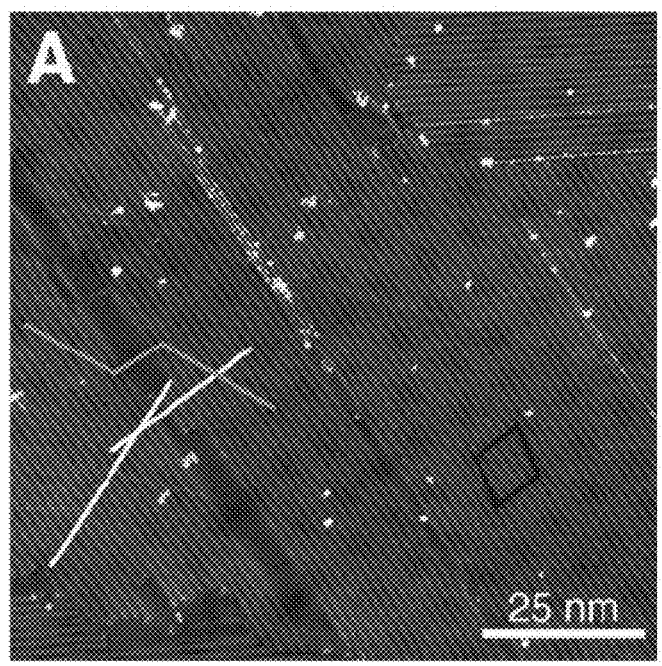
FIGS. 9A-F. Detailed structure and morphology of striped phase. (A) STM topographic image of the interior of a borophene sheet grown at 700° C., demonstrating rhombohedral Moiré pattern and regions of non-buckled rectangular lattice ($V_{sample}$=1.2 V, $I_t$=500 pA). (B) Atomic resolution image of a borophene striped sheet. Upper inset: FFT of (B). Lower inset: high resolution image (both images at $V_{sample}$=0.1 V, $I_t$=500 pA). (C) Moiré pattern generated from the superposition of a strained borophene lattice (4% compressive along the a direction) on the Ag(111) plane. The insets show magnified views of the Moiré trough and crest, detailing the different adsorption sides in each. (D) Images of 550° C. growth, detailing the interfacial relationship between a striped phase domain with periodic buckling, and a striped phase domain with nearly complete stripe coverage ($V_{sample}$=0.2 V, $I_t$=3.0 nA). Purple arrows denote rectangular lattice regions, the blue arrow denotes a non-Moiré striped phase, and the green arrow denotes a Moiré striped phase. (E) Atomic resolution image detailing the limited structural coherency and common structural motifs between the rectangular and striped phases ($V_{sample}$=0.1 V, $I_t$=3.0 nA). (F) Atomically resolved image of striped phase region generated by the coalescence of multiple islands. The smaller striped domain exhibits a "bullet-like" shape characteristics of the homogeneous phase ($V_{sample}$=0.1 V, $I_t$=1.0 nA).
Figure 9B:
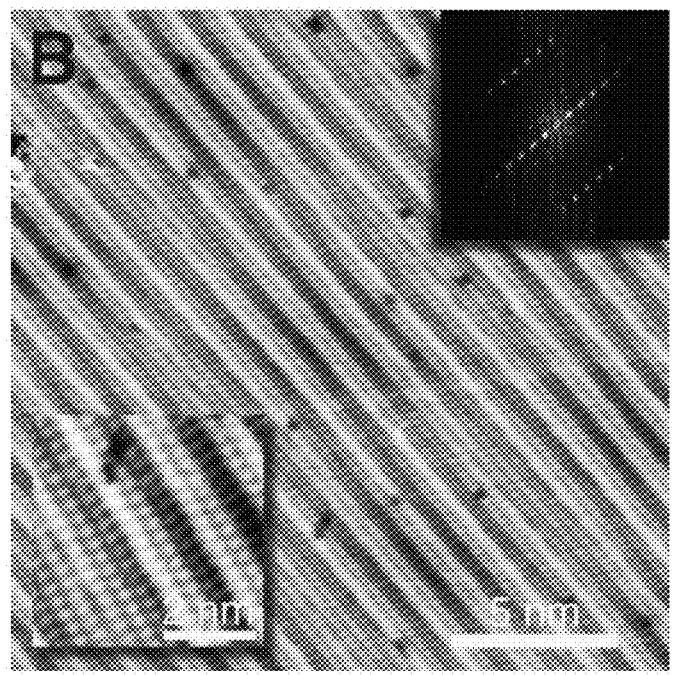
Figure 9C:
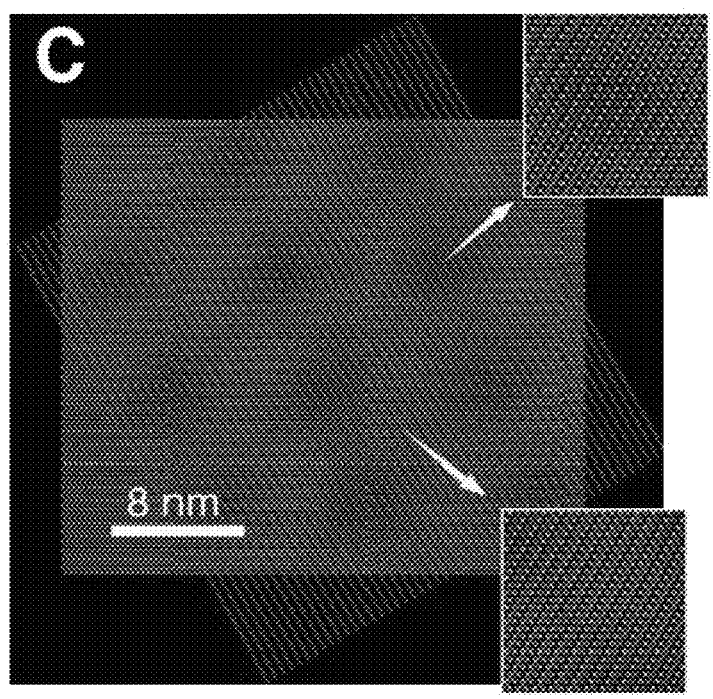
Figure 9D:
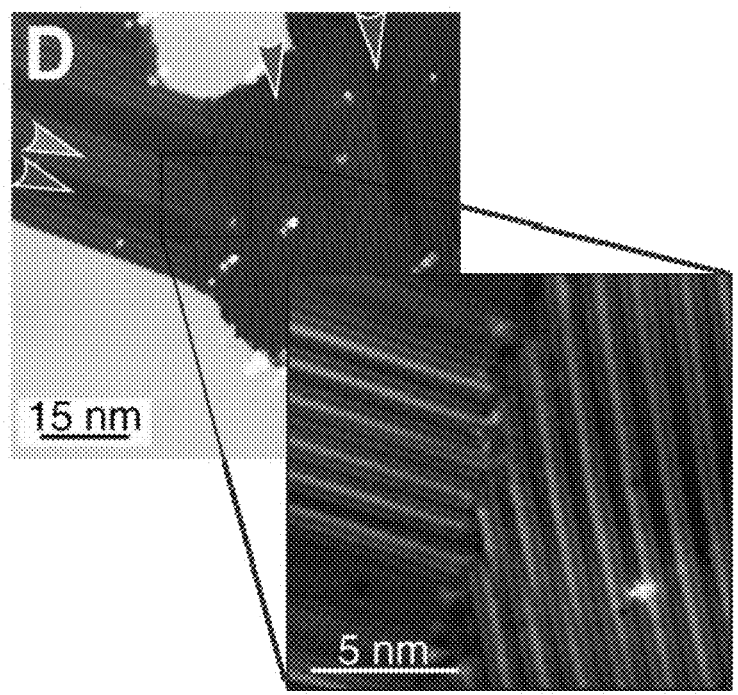
Figure 9E:
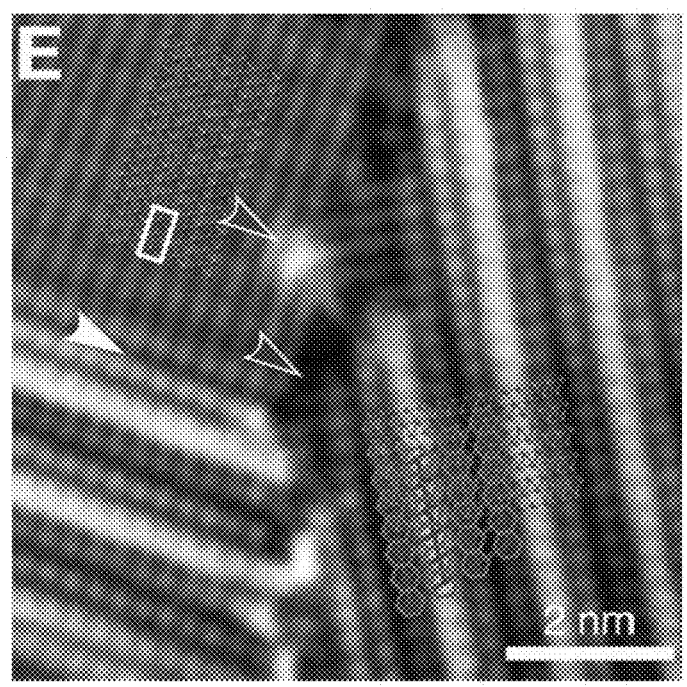

Uniaxial stripe structures are common in 2D material heteroepitaxy, resulting from dissimilar symmetries, strain relaxation, and inhomogeneous substrate interactions. Growth at 700° C. results in striped phase islands with a ~8 nm rhombohedral Moiré pattern (FIG. 9A). However, there are always regions with the rectangular lattice within striped phase domains, which appear as the dark regions in FIG. 9A. The Moiré pattern continues over these rectangular lattice regions, but is distorted translationally (shown by the jog in periodicity marked with a blue line) and rotationally (marked by the misalignment of the white lines). The atomic scale structure within the Moiré striped regions is shown in FIG. 9B. In addition to the bucking of adjacent stripe features relative to their neighbors, we observed additional displacement (i.e., depressions) induced by the large-scale Moiré. Similar buckling is associated with the superposition of domains with dissimilar symmetry. The FFT inset demonstrates the emergence of spots that correspond to those highlighted in orange and purple in FIG. 7F.

The rhombohedral Moiré pattern can be reproduced (FIG. 9C) by superimposing a borophene lattice (blue spheres) upon the Ag(111) surface (green spheres), assuming no tilt from the theoretically calculated orientation and a 4% in-plane compressive strain along the a direction. The insets show magnified regions of the Moiré pattern. In the apparent crest (lighter regions, shown in lower inset), we see alignment between the B atoms and the hollow sites, whereas the valleys in the Moiré pattern (darker regions, shown in upper inset) show alignment with the Ag atoms. This suggests that the adsorption side of the boron atoms drives the corrugation of the striped phase. In BN growth on various transition metal substrates, boron is known to preferentially adsorb in the hollow sites of the hexagonal surface, which is consistent with this analysis.

At a growth temperature of 550° C. (FIG. 9D), regions of Moiré striped phase were observed coincident with less regularly striped domains, rotated by 120°. Despite this incongruity in stripe pattern and the rotation, the domain boundary remains relatively featureless. The congruity between these phases at the atomic scale becomes apparent in FIG. 9E. Regions of the rectangular lattice coincide smoothly with the striped structure (indicated by white arrow). The rectangular and Moiré striped regions appear to bond readily with one another (indicated by green arrow), revealing connected features with three-fold symmetry at the interface. Nearby, several unit cells of the rectangular lattice are observed to flow smoothly into the Moiré striped phase. The structure of the striped phase regions near large gaps between the domains (indicated by blue arrow) suggests that the striped phase consists of a more highly buckled lattice. Comparison with the overlaid structure models on the rectangular lattice region (upper left) and the striped phase region (lower right) shows that ~5% strain along the a direction provides coincidence with the striped phase lattice, consistent with the Moiré pattern simulated in FIG. 9C. Comparison between the overlaid structure model and the striped phase allow us to define a transformation matrix $$\begin{pmatrix} a_r^* \\ b_r^* \end{pmatrix} = \begin{pmatrix} 15/2 & 3/2 \\ 0 & 1 \end{pmatrix} \begin{pmatrix} a_i^* \\ b_i^* \end{pmatrix}$$

where the subscripts i and r denote the initial and reconstructed lattice vectors, respectively.

Figure 9F:
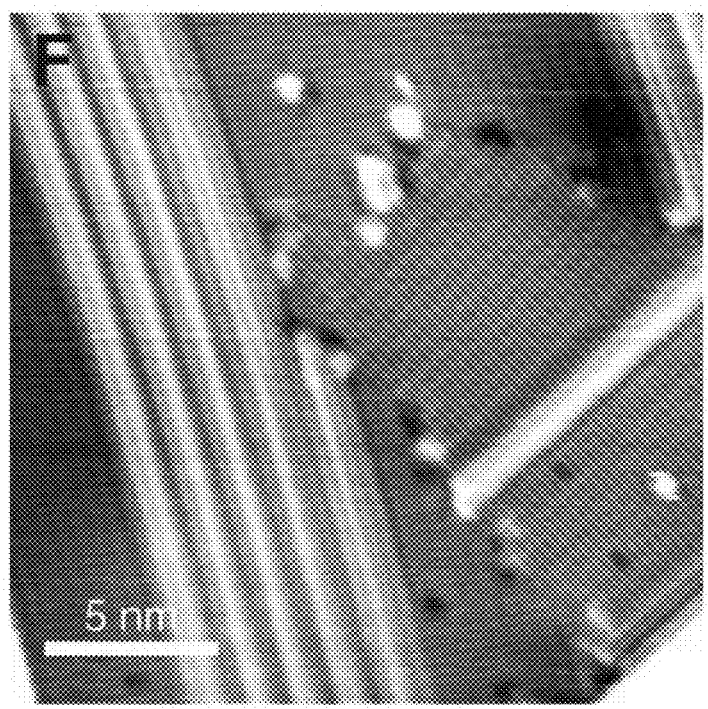

Certain features in STM provide further evidence for conversion from the homogeneous phase to the striped phase. FIG. 9F shows a region in which a grain of striped phase is divided into multiple domains. The smaller domain exhibits an overall shape consistent with that typically found in the homogeneous phase. Additionally, the shape of the striped phase domains often closely resembles those of the homogeneous phase (FIGS. 1F,G), but is more compact in size.

Example 5

Scanning Transmission Electron Microscopy/Electron Energy Loss Spectroscopy.

Figure 14A:
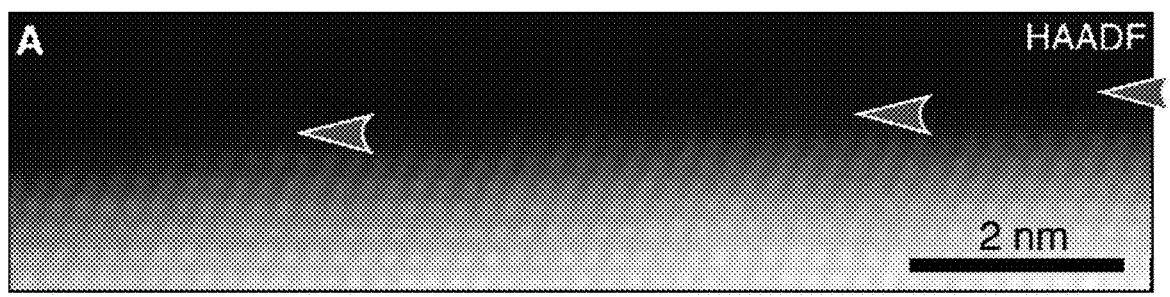
FIGS. 14A-B. Additional AC-STEM data. AC-STEM images acquired on an atomically stepped surface region with (A) HAADF and (B) ABF detectors. The purple arrows are located at the same relative positions between images, and indicate the presence of light elemental planar features, which are identified as borophene.
Figure 14B:
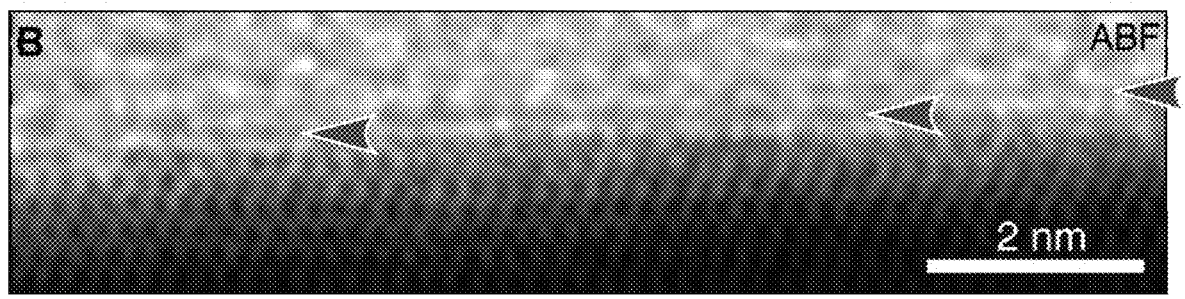

The HAADF operation mode works well for materials with different Z number because the intensity dependence on atomic number is close to $Z^{3/2}$. In FIG. 14A, a HAADF-STEM image shows atomic positions of silver. However, light elements such as boron, carbon or oxygen are not detectable by HAADF imaging. In the JEOL ARM200F microscope bright field (BF) images can be collected at the same time as the HAADF images are recorded. The BF detector in the microscope has been configured so that it can register light atoms (extremely weak scattering) using the circular beam stopper in the center of the optical axis. Under these conditions, annular bright field (ABF) and HAADF images can be recorded at the same time as well. ABF imaging has proven to be an effective mean of visualization for lighter atoms, such as boron as shown in FIG. 14B.

Figure 15A:
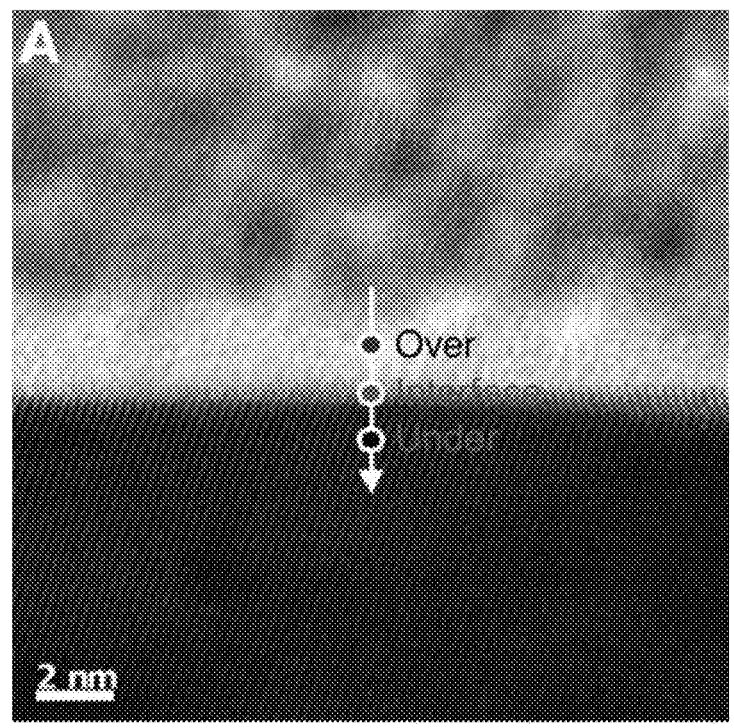
FIGS. 15A-B. STEM EELS. (A) AC-STEM survey image, with the location of the EELS line profile indicated. (B) Plot of EELS spectra from the regions indicated in (A). The interface spectrum (red) shows that a strong boron peak (188 eV) is localized to the area near the interface, as confirmed by the deconvoluted boron peak (purple). These spectra show that the boron is confined to the interface between the Ag(111) substrate and the Si capping layer.
Figure 15B:
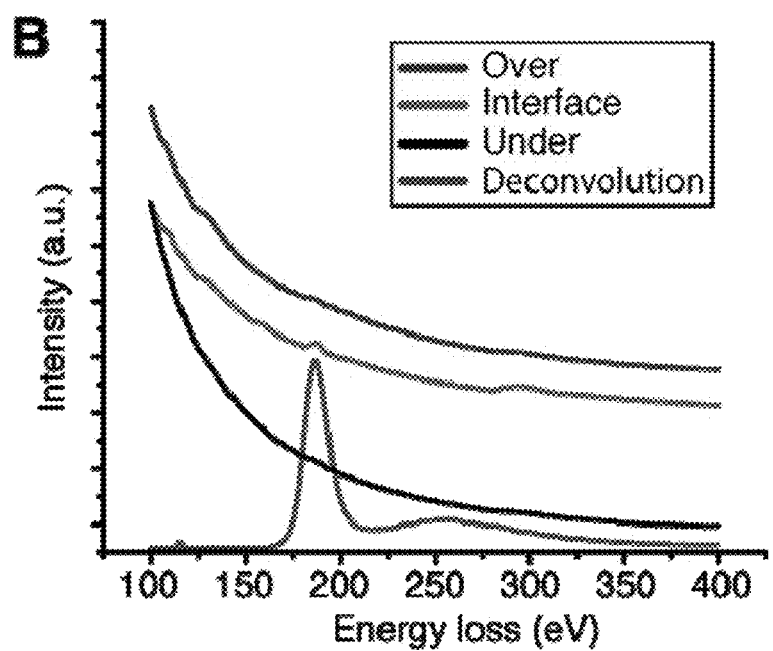

A STEM-EELS analysis is used to probe the boron signal, the line scan is shown in FIG. 15A. An intensity profile extracted from the EELS spectrum at the B K edge (~188 eV) is correlated with the HAADF image intensity profile of the same scanned region. During the acquisition, the spectrum of the B K edge intensity is recorded simultaneously with the HAADF signal. The significant increase in the B K edge intensity profile observed at the interface between silver/boron/silicon is shown in FIG. 15B (red curve, boron deconvolution shown in purple curve). Additional peaks between 100 and 150 eV are associated with silicon and silicon oxide, and match those in the capping layer (blue curve).

Example 6

X-Ray Photoelectron Spectroscopy.

Survey spectra on silicon-capped samples (FIG. 17A) show peaks for Ag, B, Si, O, and adventitious C (which is always present following ambient exposure). Cross-sectional STEM shows an average Si capping layer thickness of 2-4 nm, comparable to the escape depth for photoelectrons in XPS. This allows us to probe the chemistry of the Ag substrate, boron film, and Si capping layer simultaneously.

Figure 3D:
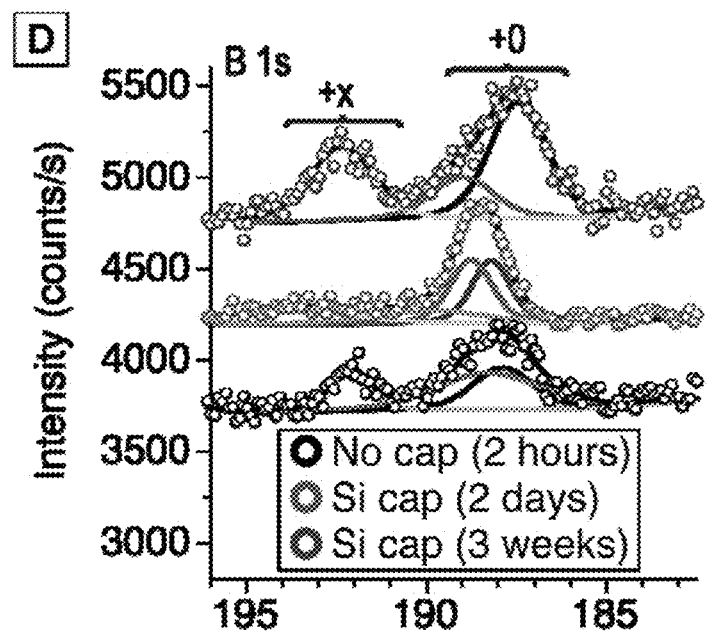
Figure 3E:
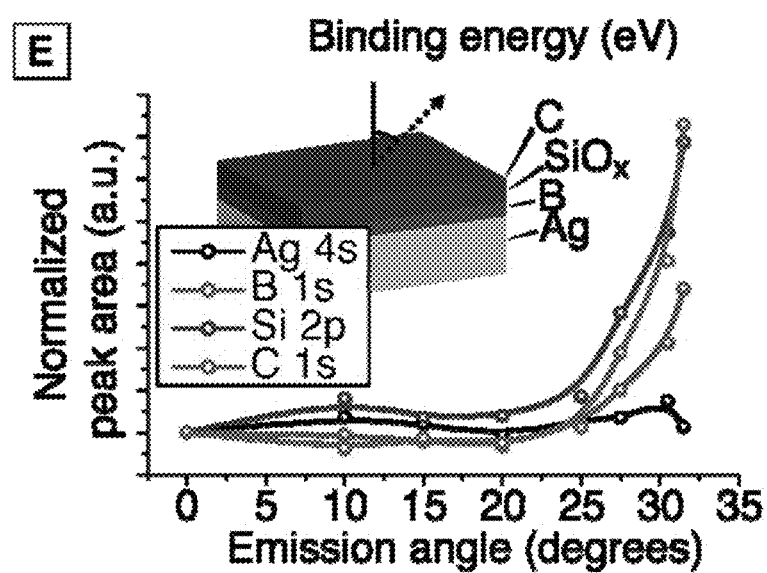
Figure 17A:
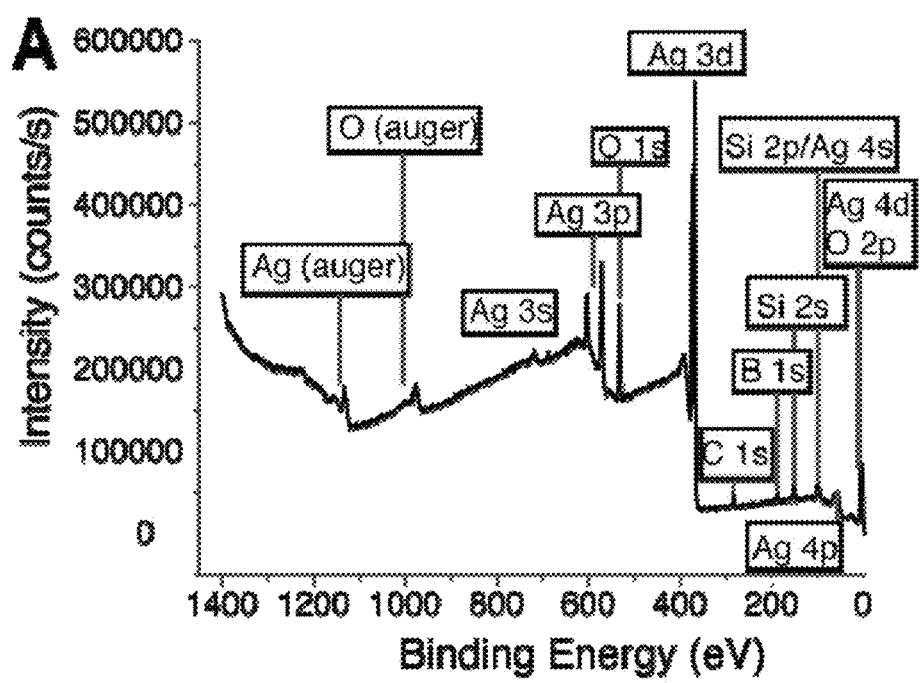
FIGS. 17A-E. Additional XPS analysis. (A) XPS survey spectrum, demonstrating the presence of Ag, B, Si, C, and O. (B) Si 2p core level data, demonstrating the presence of the almost fully oxidized amorphous silicon (~103 eV) capping layer adjacent to the Ag 4 s peak. (C) C is core level spectrum, demonstrating the absence of any peaks besides adventitious carbon. (D) Ag 3d core level spectra, showing the silver peaks are unaltered by the B and Si cap deposition. (E) Angle-resolved XPS data showing normalized component peak heights for the species present.
Figure 17B:
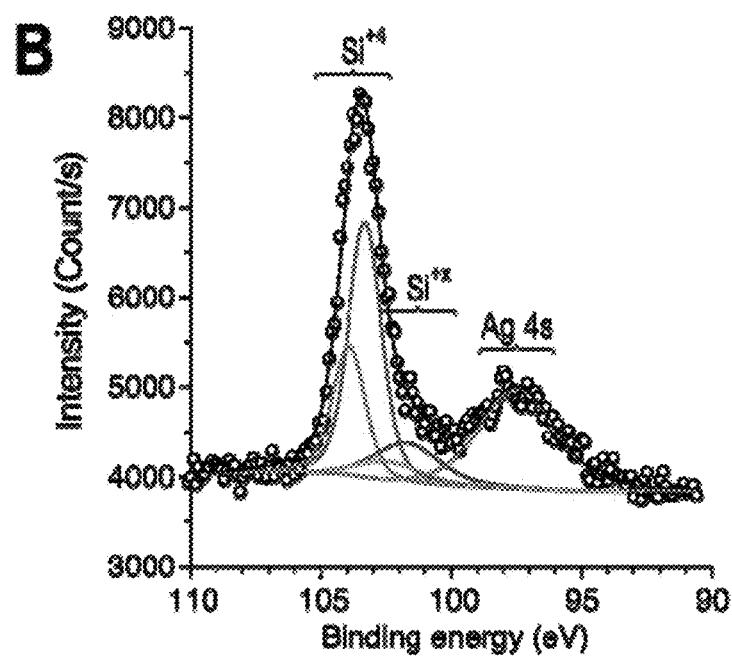
Figure 17C:
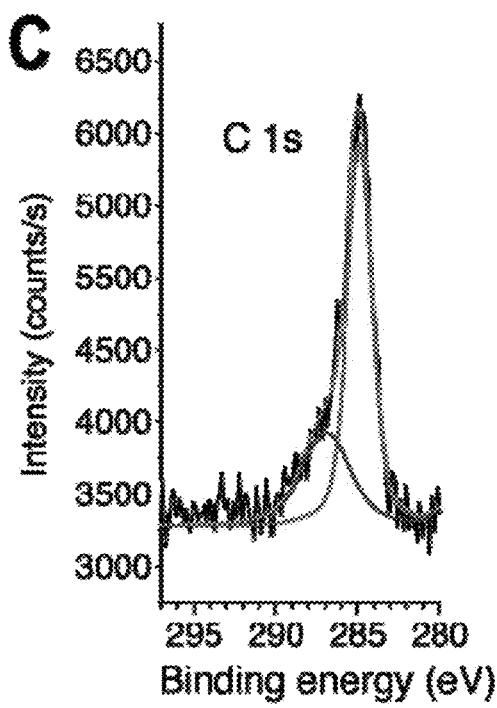
Figure 17D:
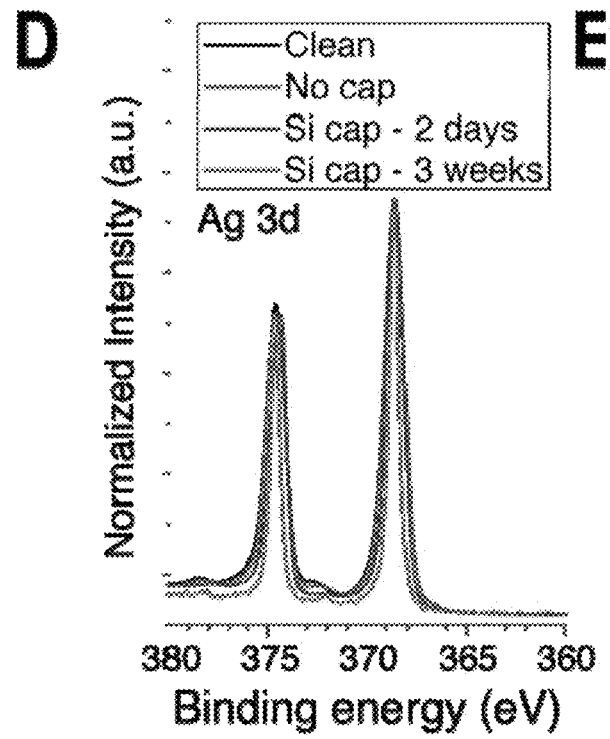

Because pure boron slowly oxidizes under ambient conditions, borophene samples capped with silicon were compared with ambient-exposed borophene to determine the oxidation state of the material as deposited, shown in FIG. 3D. The silicon capped sample exhibits one principal feature after 2 days, consistent with successful protection of the underlying borophene. This main peak displays an asymmetric shape composed of two components at 188.2 and 188.8 eV. These are consistent with B—B bonding in pure boron species under two slightly different chemical environments (such as boron atoms interacting directly with the substrate versus those buckled upwards). When directly exposed to ambient (i.e., no cap), peaks at 187.9, 188.3, and 192.1 eV were observed. This broadening of the principal boron peaks, as well as a partial shift towards lower binding energies, is typical of boron oxidation, as is the peak at 192.4 eV, which likely corresponds to a sub-stoichiometric oxide. Following 3 weeks of ambient exposure, the capped sample exhibits similar peaks at 187.5, 189, and 192.4 eV. The silicon capping layer was fully oxidized, as shown by the Si 2p peak doublet at ~103 eV associated with oxide formation on amorphous films (FIG. 17B). C 1 s core level spectra (FIG. 17C) showed only adventitious C, indicating that the substrate and B source are not contaminated with C (which would otherwise result in additional peaks for B—C bonds). We observed no splitting of the Ag 3d peaks (FIG. 17D), which would indicate B—Ag compound formation.

Example 7

Figure 17E:
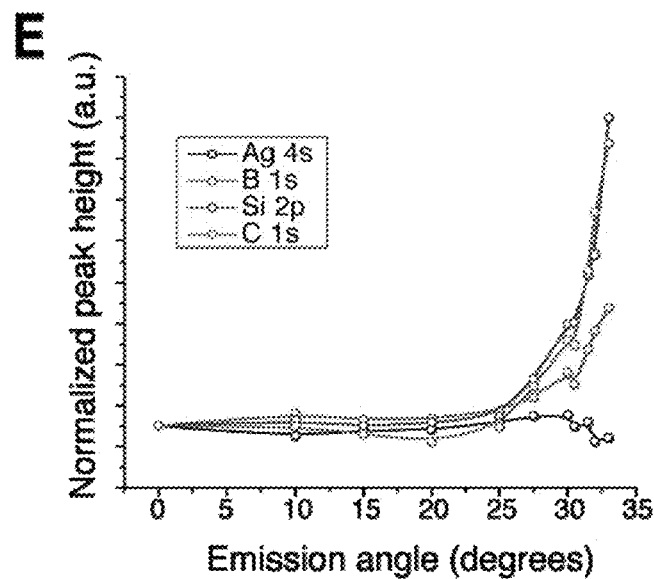

Additional angle-resolved XPS data are presented in FIG. 17E, showing the peak component height versus angle. These data revealed the same trends observed in FIG. 3E, thus supporting our proposed structure model.

Figure 4A:
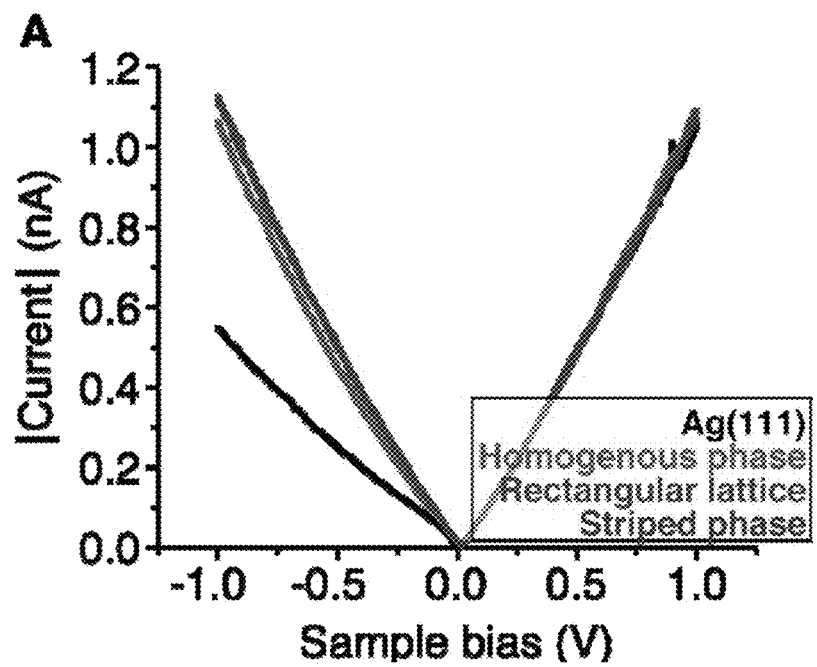
FIGS. 4A-B. Scanning tunneling spectroscopy of borophene. (A) STS I-V curves and (B) STS dI/dV spectra (inset: clean Ag(111) dI/dV spectrum) from the borophene sheets, which demonstrate metallic characteristics (Feedback loop opened at $V_{sample}$=1.0 V, $I_t$=1.0 nA).
Figure 4B:
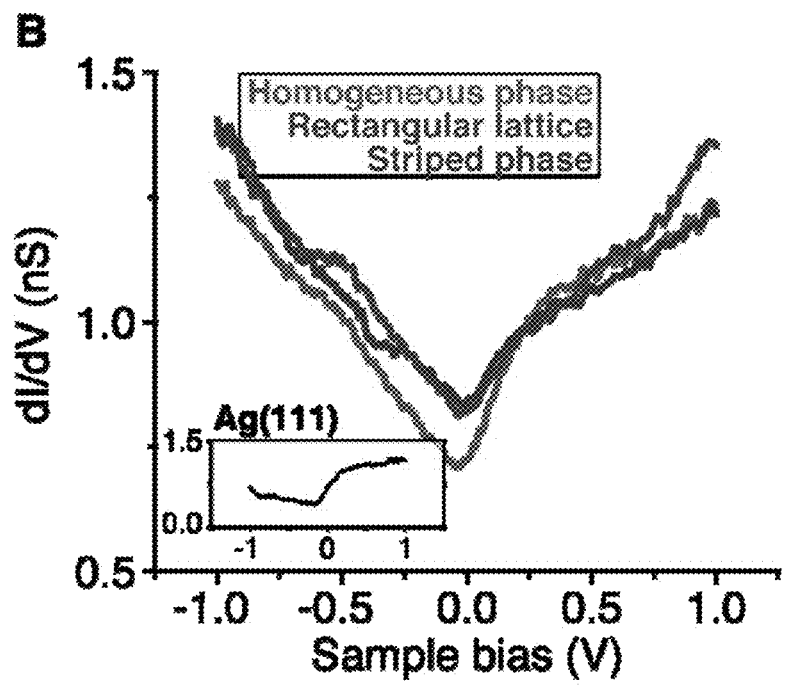

As shown above, while all known bulk boron allotropes are semiconductors at standard conditions. Scanning tunneling spectroscopy (STS) confirms the metallic characteristics of borophene through I-V curves (FIG. 4A) and dI/dV spectra (which measure the local electronic DOS, FIG. 4B). These show gapless (i.e., metallic) behavior consistent with the superposition between the Ag(111) surface and the predicted filled-state population in borophene (FIG. 2G).

We claim:

1. A boron allotrope comprising an elemental boron layer comprising a periodic lattice and a boron atomic thickness dimension.

2. The allotrope of claim 1 wherein the periodic lattice comprises a rectangular boron lattice.

3. A borophene comprising an elemental boron layer comprising a periodic lattice and a boron atomic thickness dimension.

4. The borophene of claim 3 wherein the periodic lattice comprises a rectangular boron lattice.

5. The borophene of claim 3 absent a boron compound and a boron alloy, said borophene metallic.

6. A boron allotrope comprising an elemental boron monolayer comprising a periodic lattice and a boron atomic thickness dimension, said allotrope absent a boron compound and a boron alloy.

7. The allotrope of claim 6 wherein the periodic lattice comprises a rectangular boron lattice.

8. A metallic boron allotrope comprising an elemental boron layer comprising a rectangular boron lattice and a boron atomic thickness dimension.

9. An article comprising a substrate; and a boron allotrope thereon, said allotrope comprising an elemental boron layer of boron atoms comprising a boron atomic thickness dimension.

10. The article of claim 9 wherein said allotrope comprises a rectangular boron lattice.

11. The article of claim 10 wherein said substrate comprises Ag.

12. The article of claim 11 wherein said substrate comprises single crystal Ag(111).

13. The article of claim 12 wherein said allotrope comprises at least one of a homogeneous boron phase and a striped boron phase.

14. The article of claim 13 wherein said allotrope is metallic.

15. An article comprising a silver substrate; and a metallic boron allotrope thereon, said allotrope comprising an elemental boron monolayer of boron atoms comprising a boron atomic thickness dimension, said allotrope absent a boron compound and a boron alloy.

16. The article of claim 15 wherein said substrate and said allotrope are absent oxygen and carbon contamination.

17. The article of claim 15 wherein said substrate comprises single crystal Ag(111).

18. The article of claim 17 wherein said allotrope comprises at least one of a homogeneous boron phase and a striped boron phase.

* * * * *